Figure 1B:
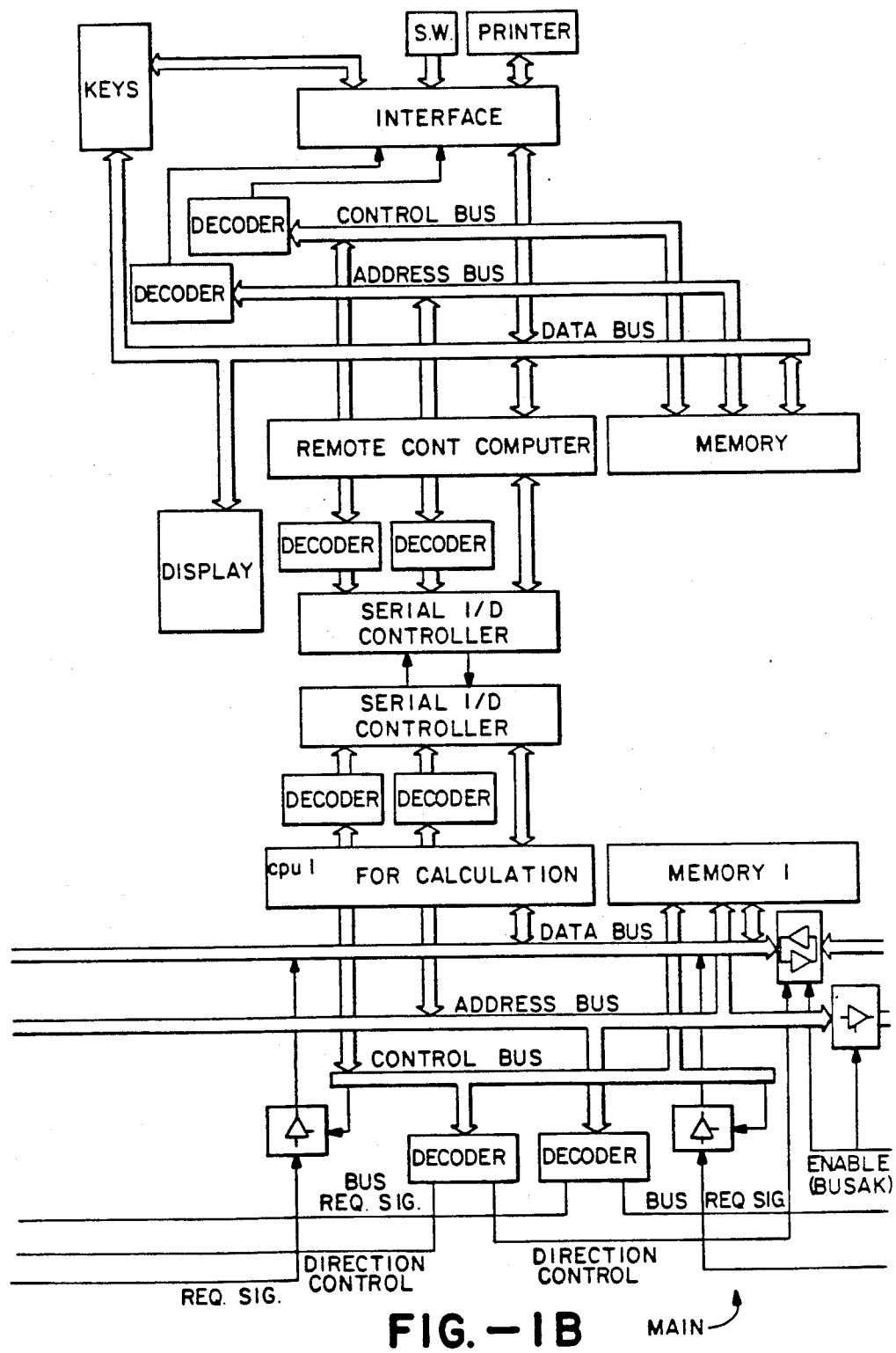

United States Patent [19]

Naito et al.

[11] Patent Number: 4,850,442

[45] Date of Patent: Jul. 25, 1989

[54] ZERO-POINT ADJUSTMENT OF WEIGHING DEVICE

[75] Inventors: Kazufumi Naito, Ohtsu; Setsuo Haze, Shiga; Hideo Nobutugu, Kyoto, all of Japan

[73] Assignee: Ishida Scales Manufacturing Company, Ltd., Kyota, Japan

[21] Appl. No.: 196,211

[22] Filed: May 19, 1988

Related U.S. Application Data

[62] Division of Ser. No. 94,119, Sep. 4, 1987, Pat. No. 4,771,836, which is a division of Ser. No. 772,244, Sep. 3, 1985, Pat. No. 4,694,920.

[51] Int. Cl.⁴ ................. G01G 23/14; G01L 25/00
[52] U.S. Cl. ........................ 177/164; 73/1 B
[58] Field of Search .................... 177/164; 73/1 B

[56] References Cited

U.S. PATENT DOCUMENTS

| | | | |
|---|---|---|---|
| 3,869,004 | 3/1975 | Gallo | 177/25.14 |
| 4,117,898 | 10/1978 | Moriyama | 177/165 |
| 4,330,837 | 5/1982 | Itani | 177/25.13 |
| 4,661,920 | 4/1987 | Haze | 177/164 X |

*Primary Examiner*—George H. Miller, Jr.
*Attorney, Agent, or Firm*—Flehr, Hohbach, Test, Albritton & Herbert

[57] ABSTRACT

A zero-point adjustment unit for a weighing device is comprised of a rough adjustment circuit, a fine adjustment circuit and a central processing unit. The central processing unit adjusts the zero-point of the weighing device by receiving a no-lead weight signal outputted from the weighing device and controls the output signals from the rough and fine adjustment circuits.

3 Claims, 23 Drawing Sheets

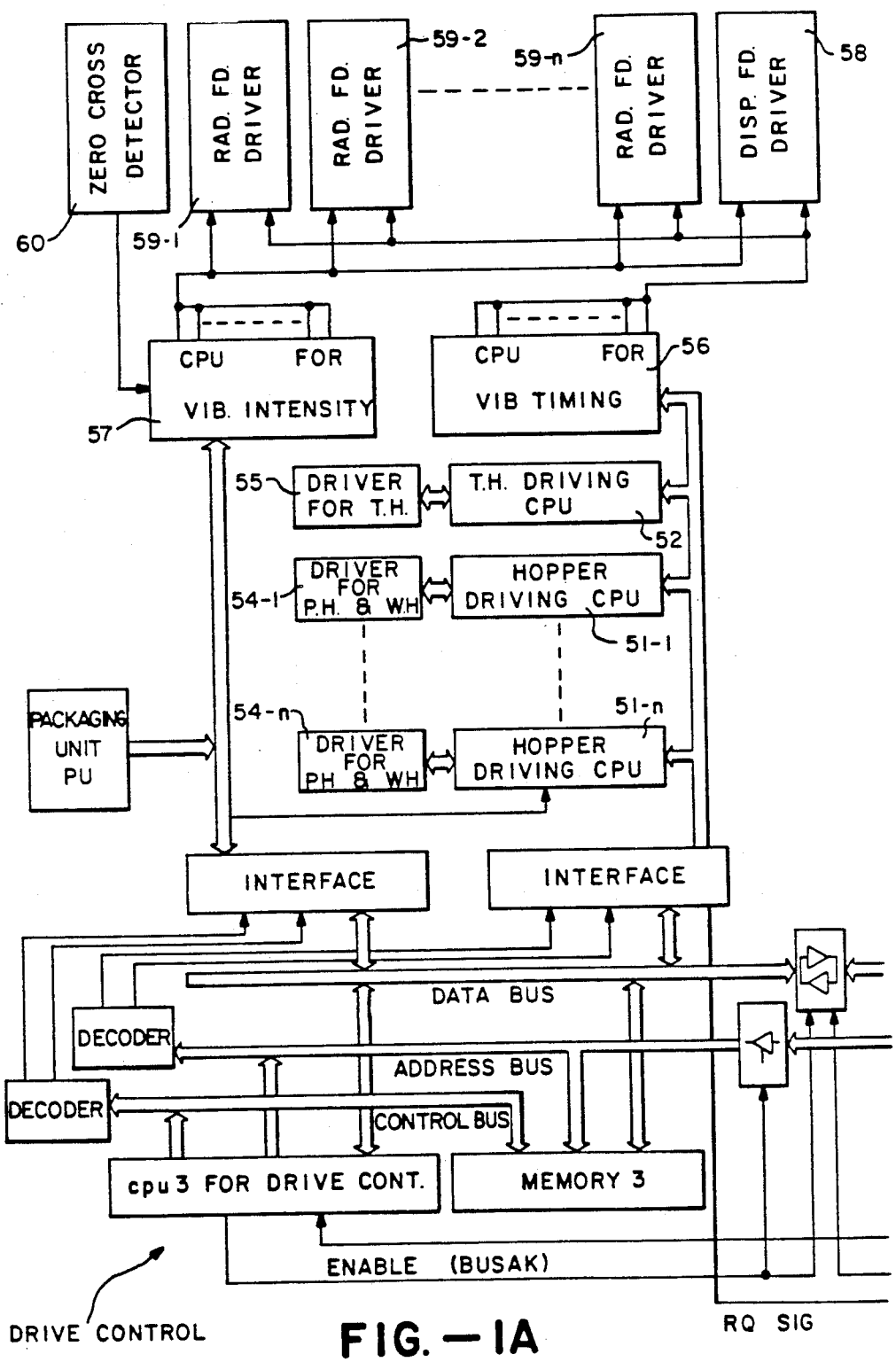
FIG.—1A

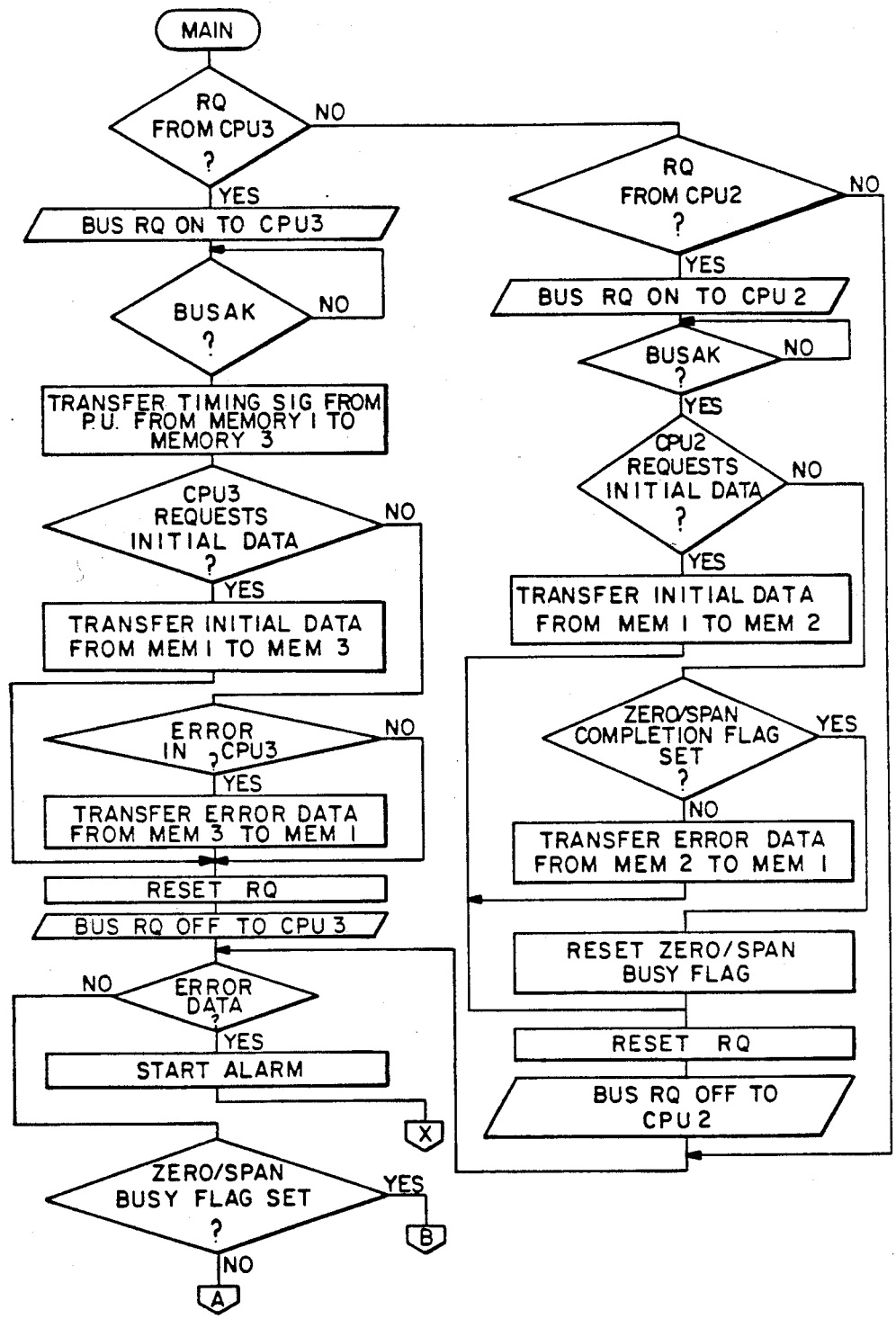
FIG. —2A

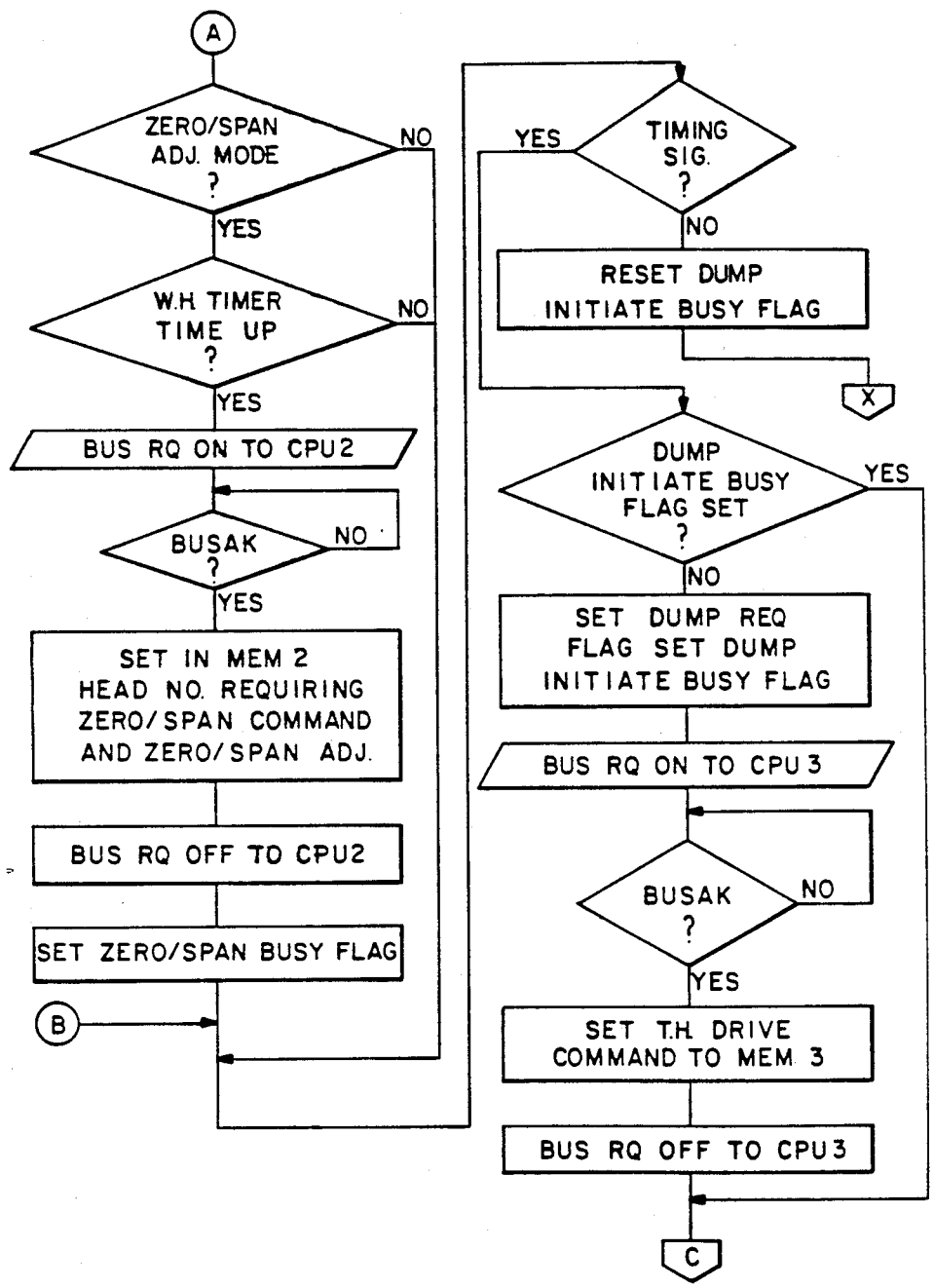
FIG. — 2B

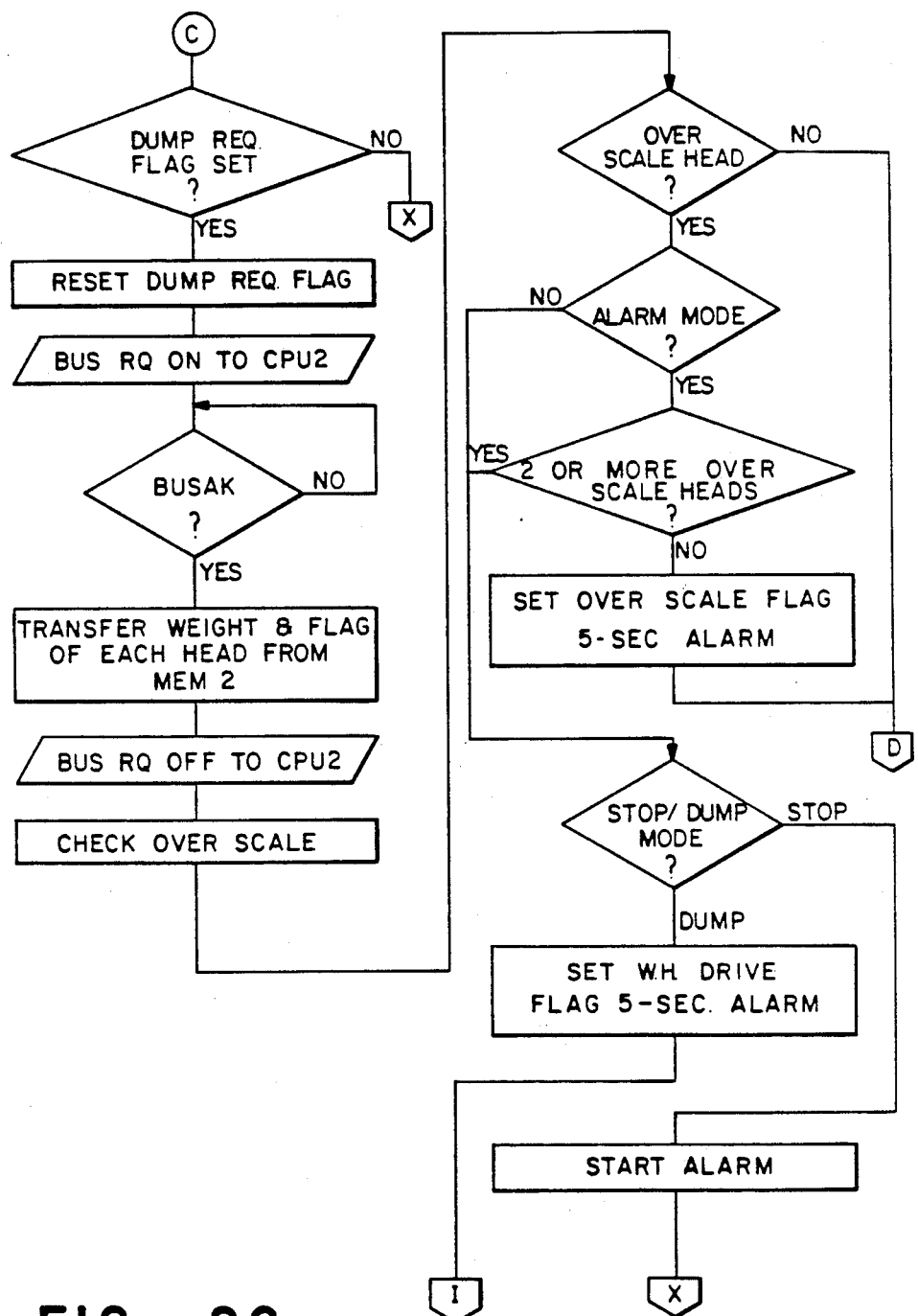
FIG.—2C

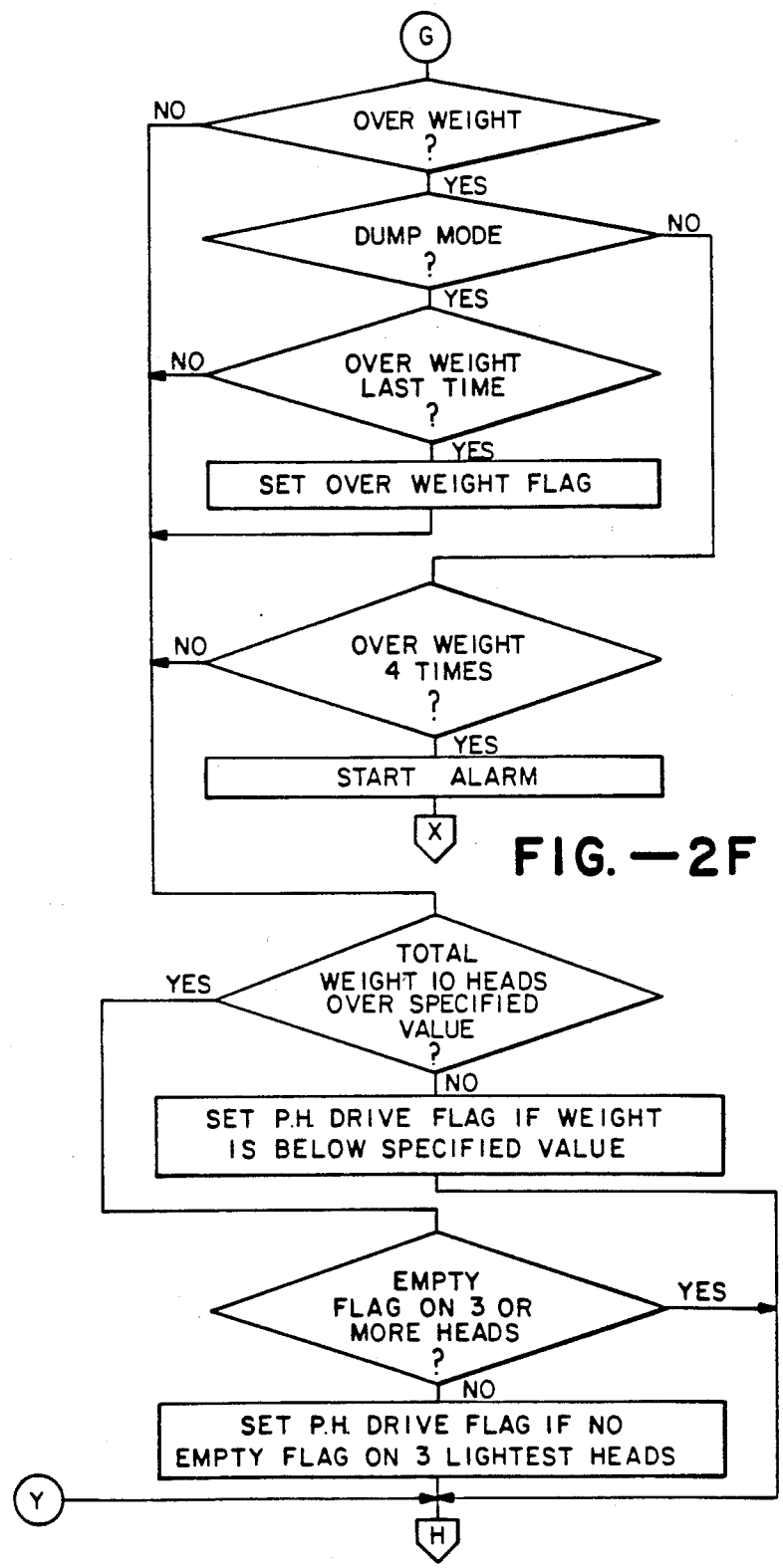
FIG.—2F

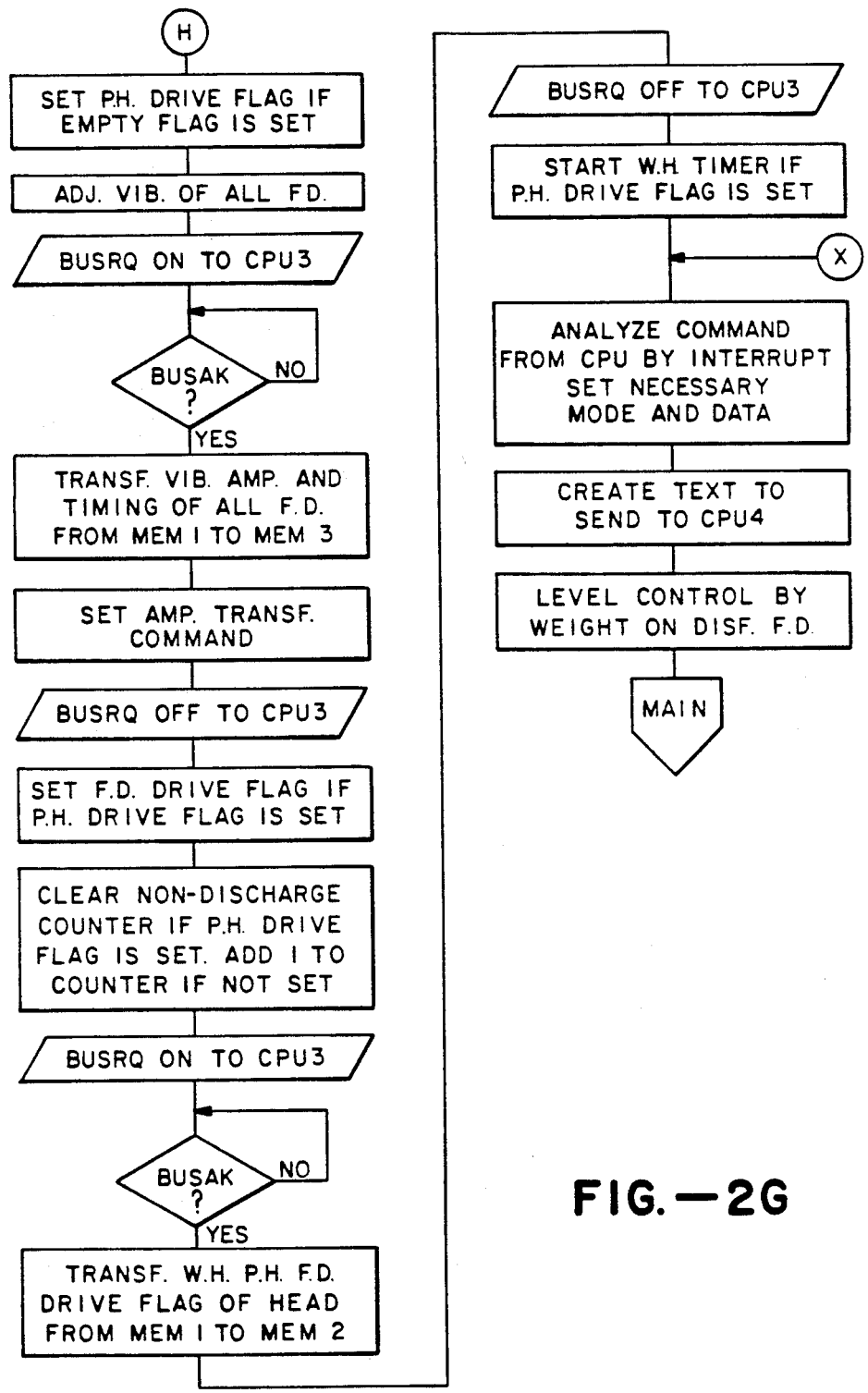
FIG.—2G

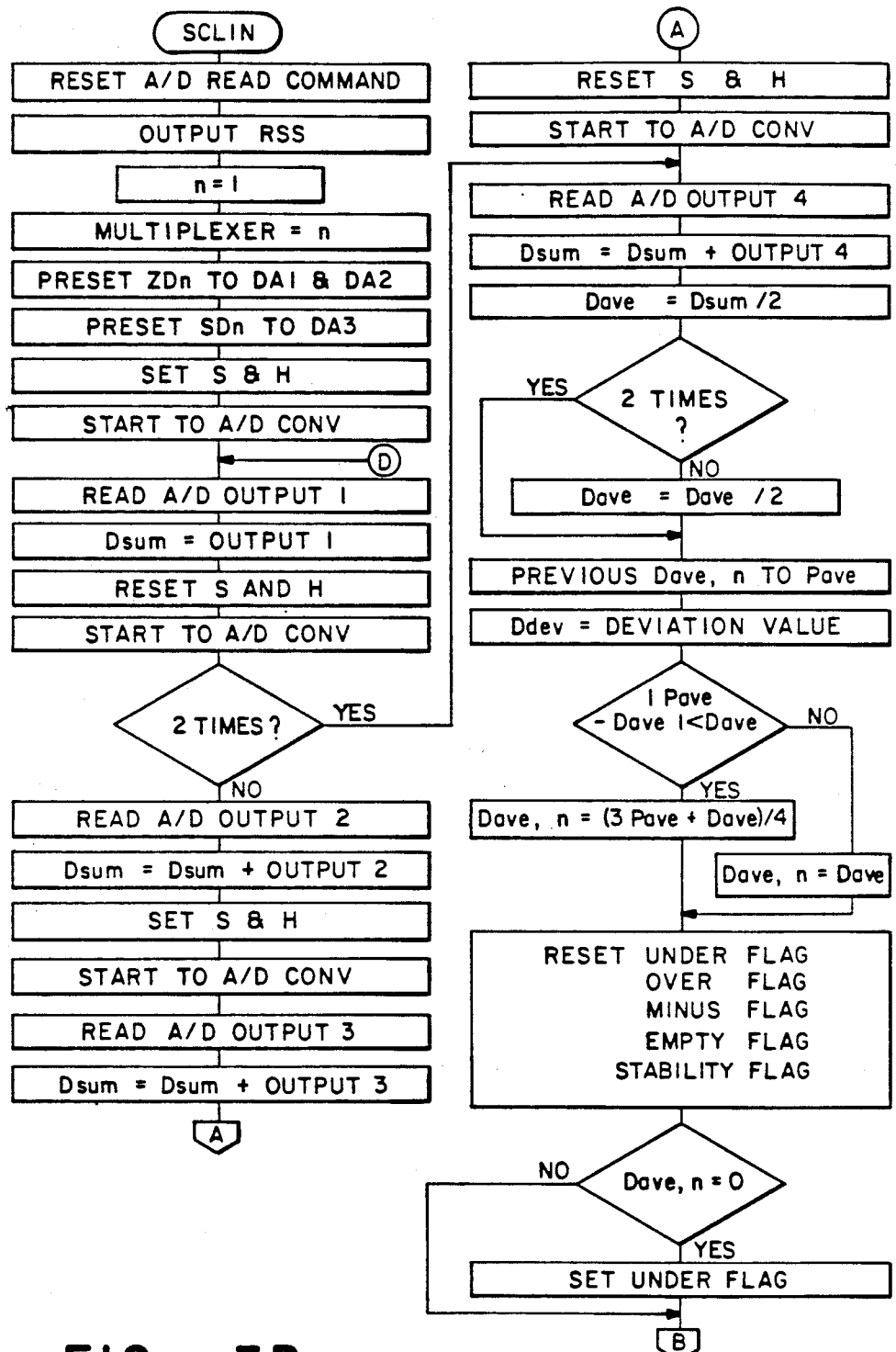
FIG. — 3B

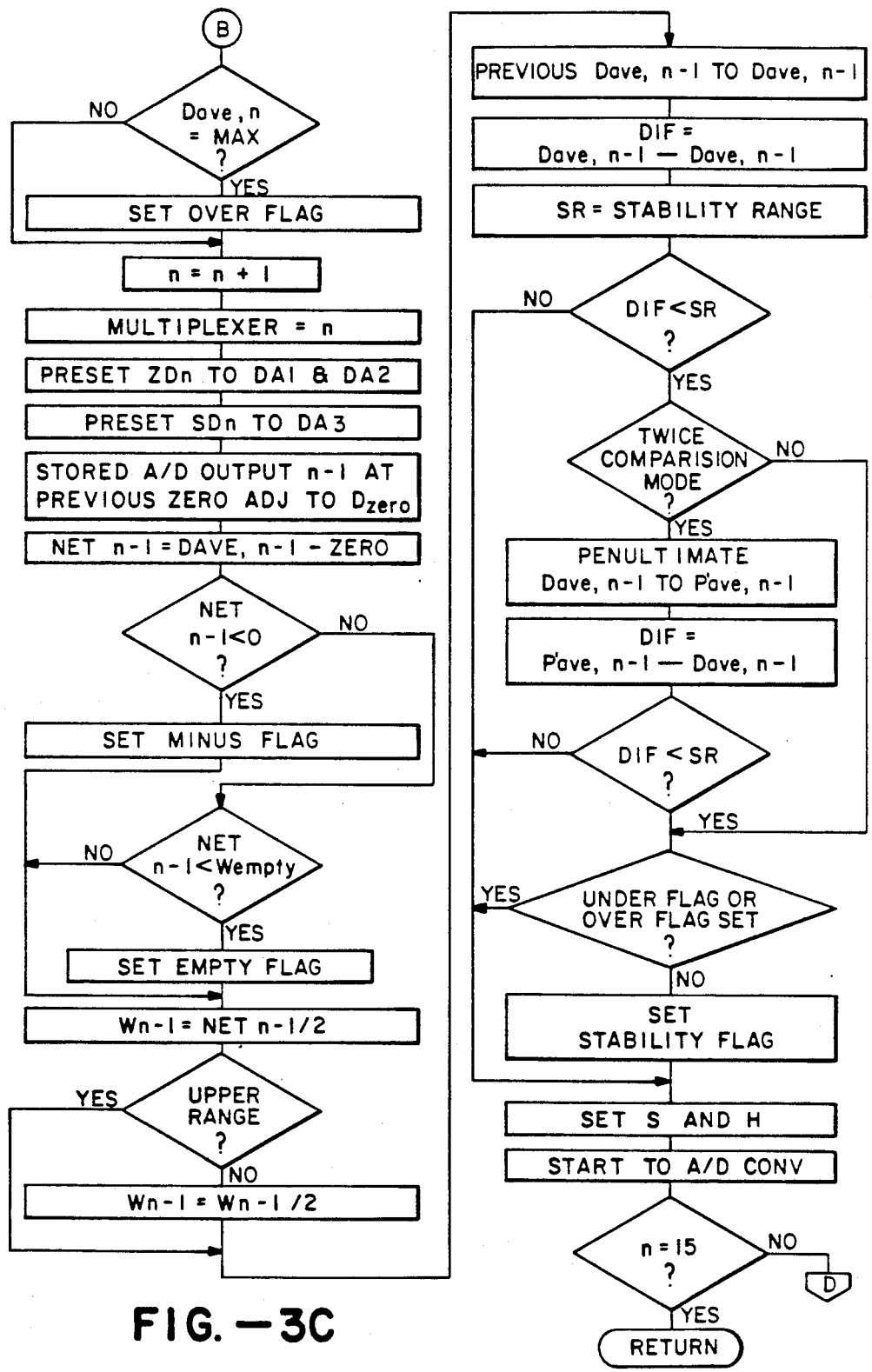
FIG.—3C

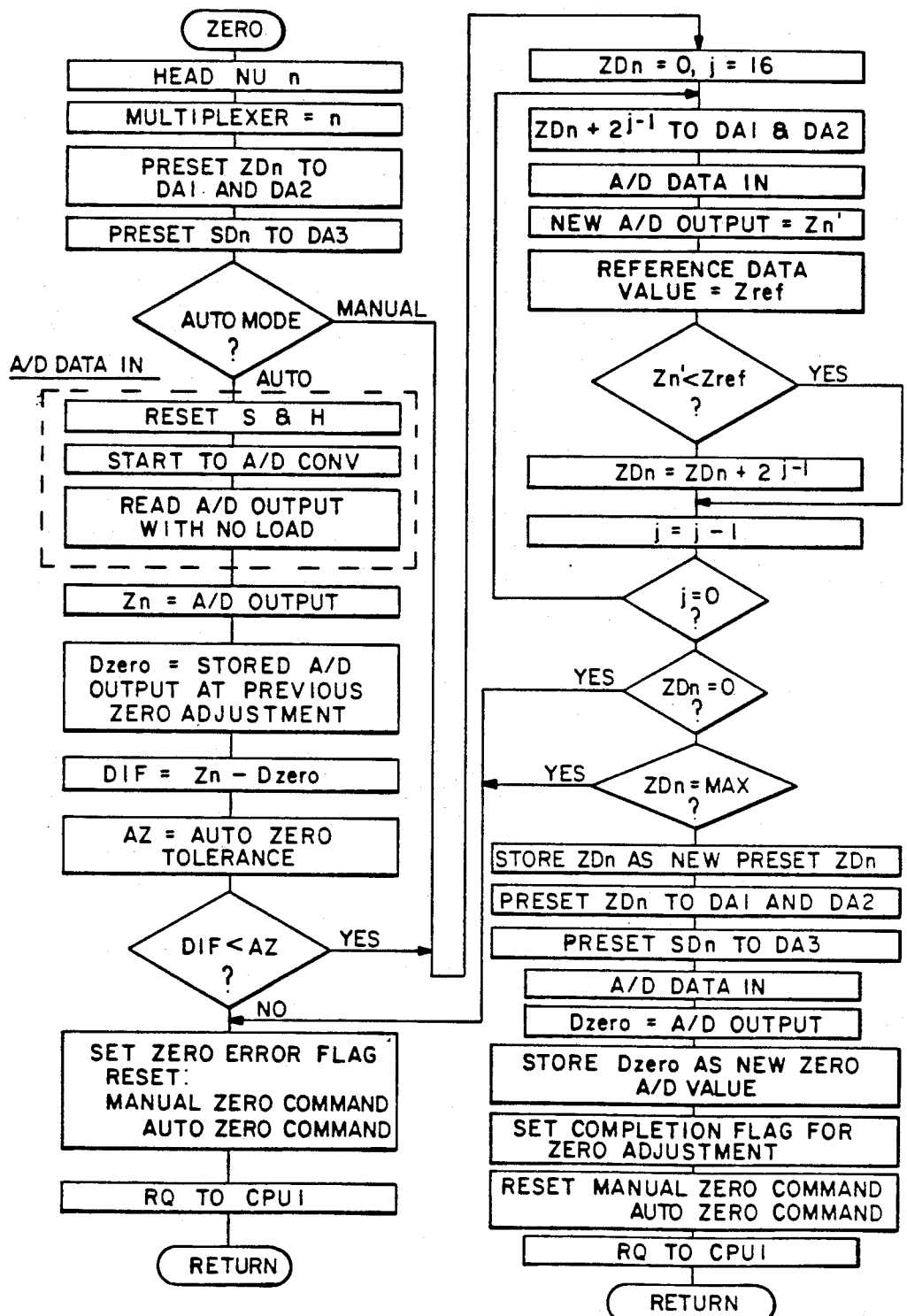
FIG.—3D

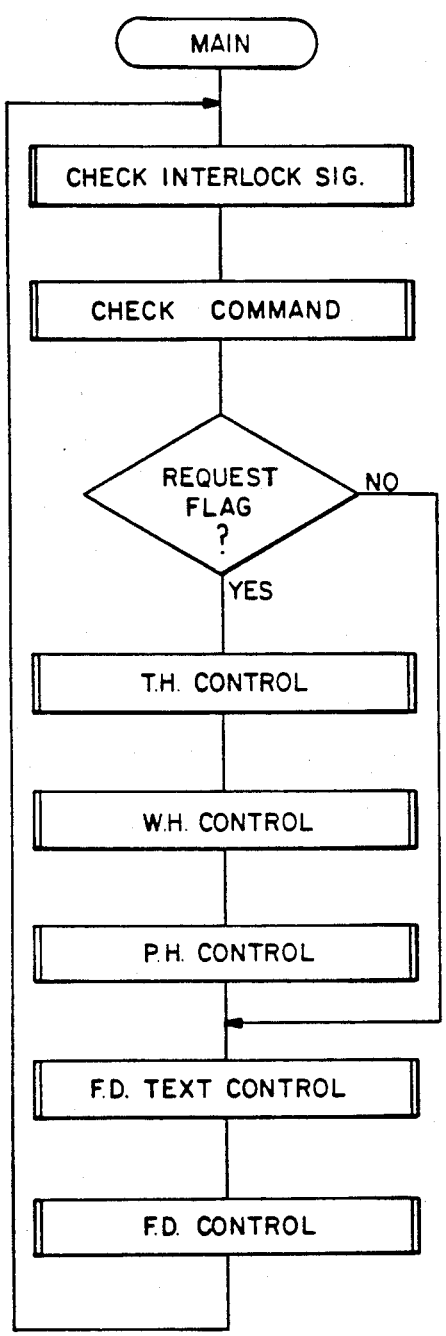
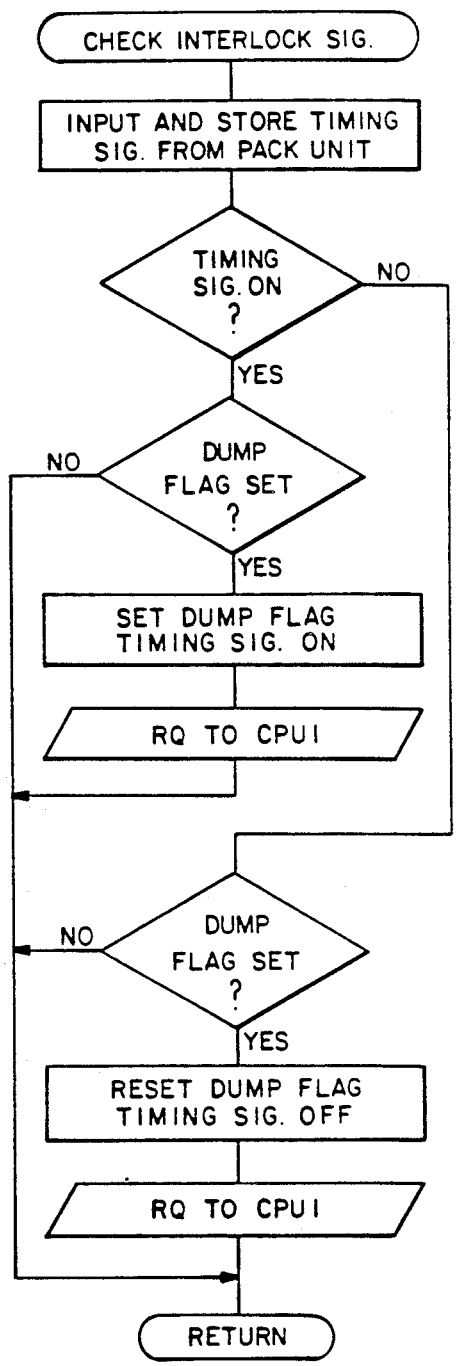
FIG.—4A  FIG.—4B

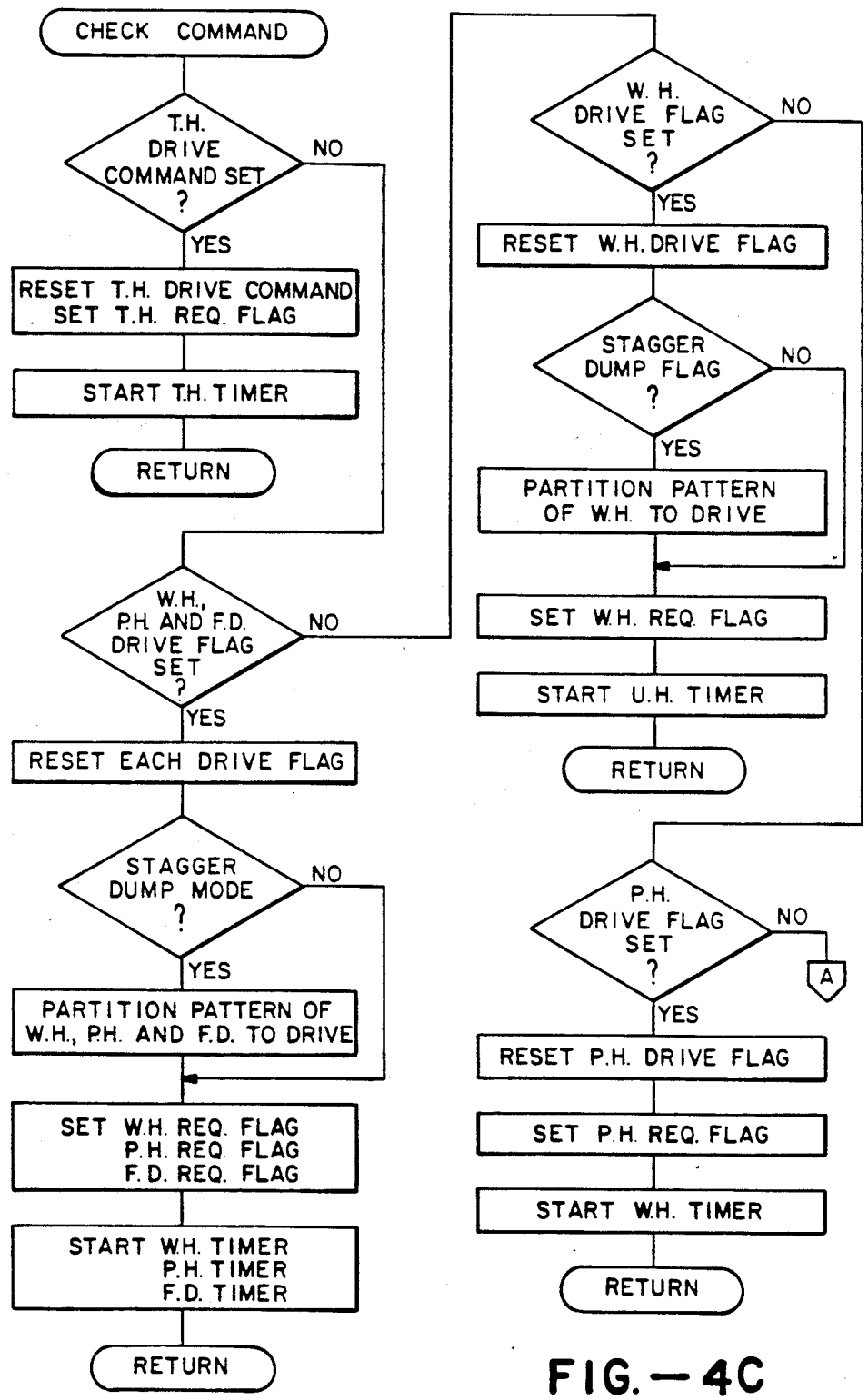
FIG.—4C

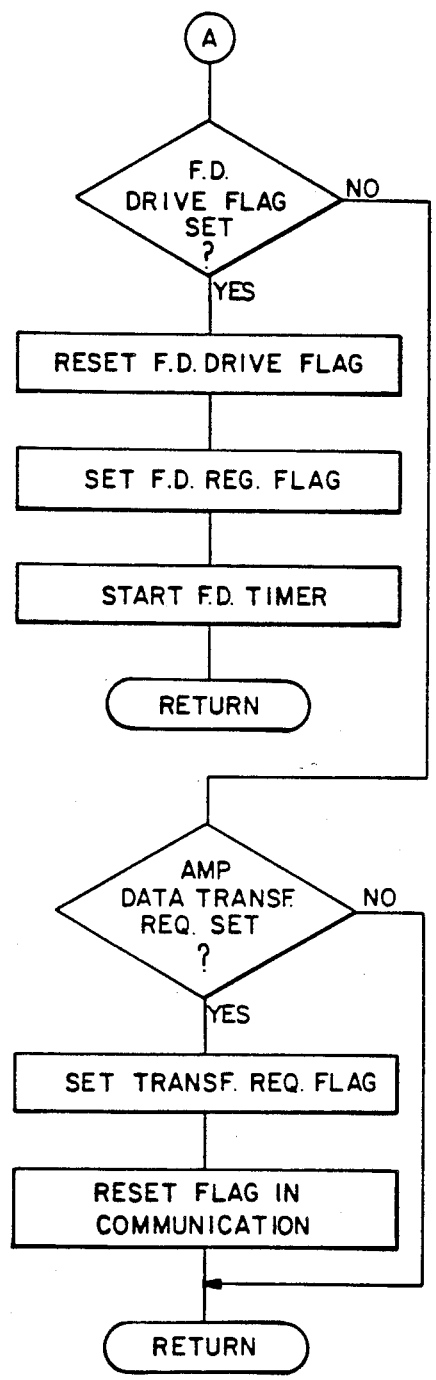
FIG.—4D
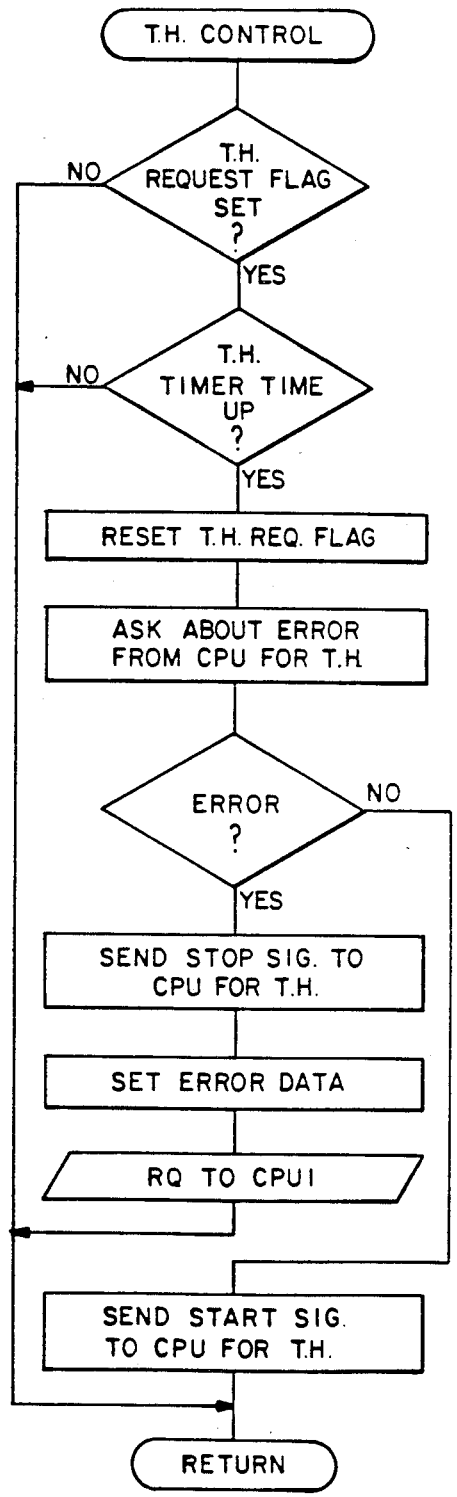
FIG.—4E

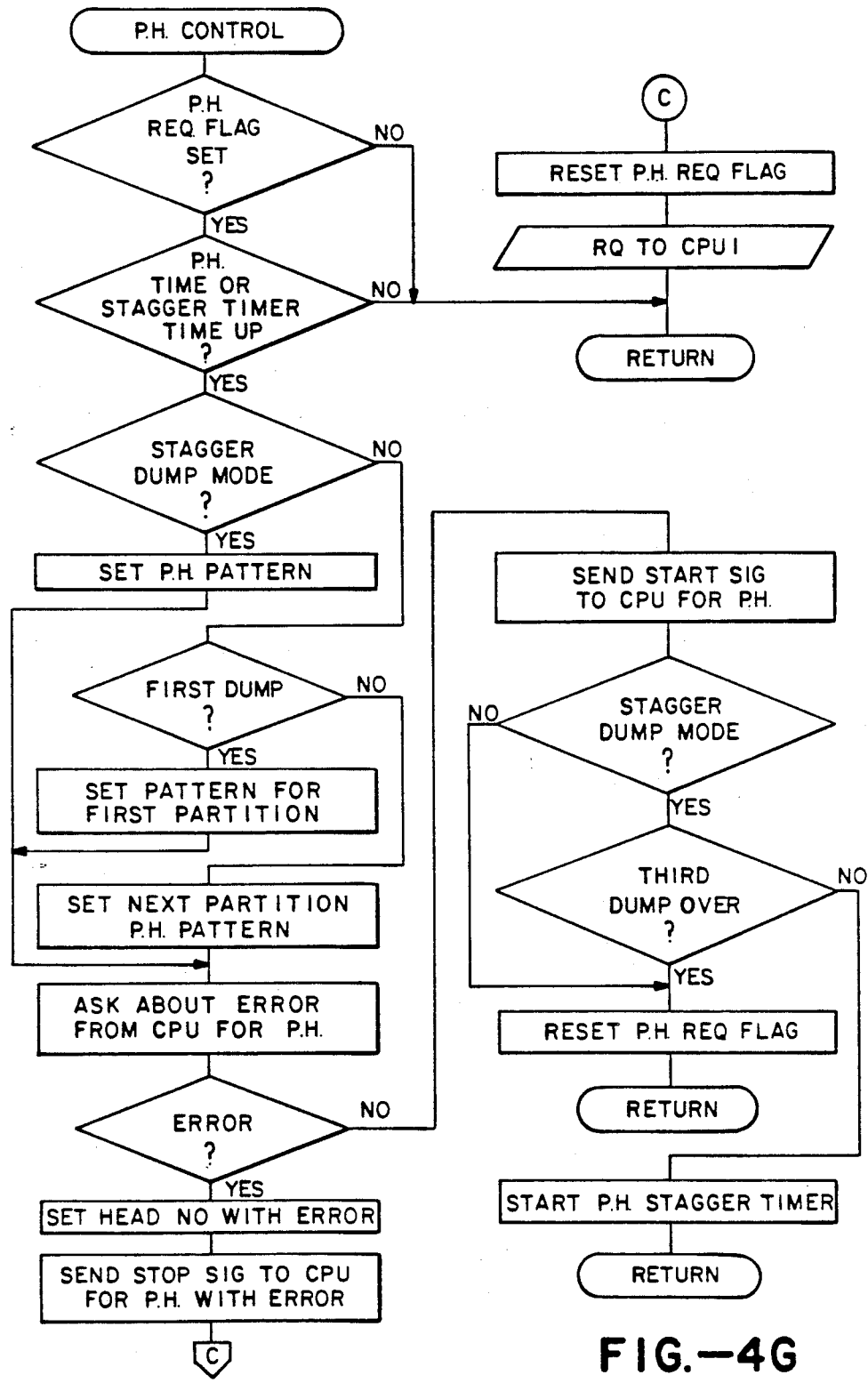
FIG.—4G

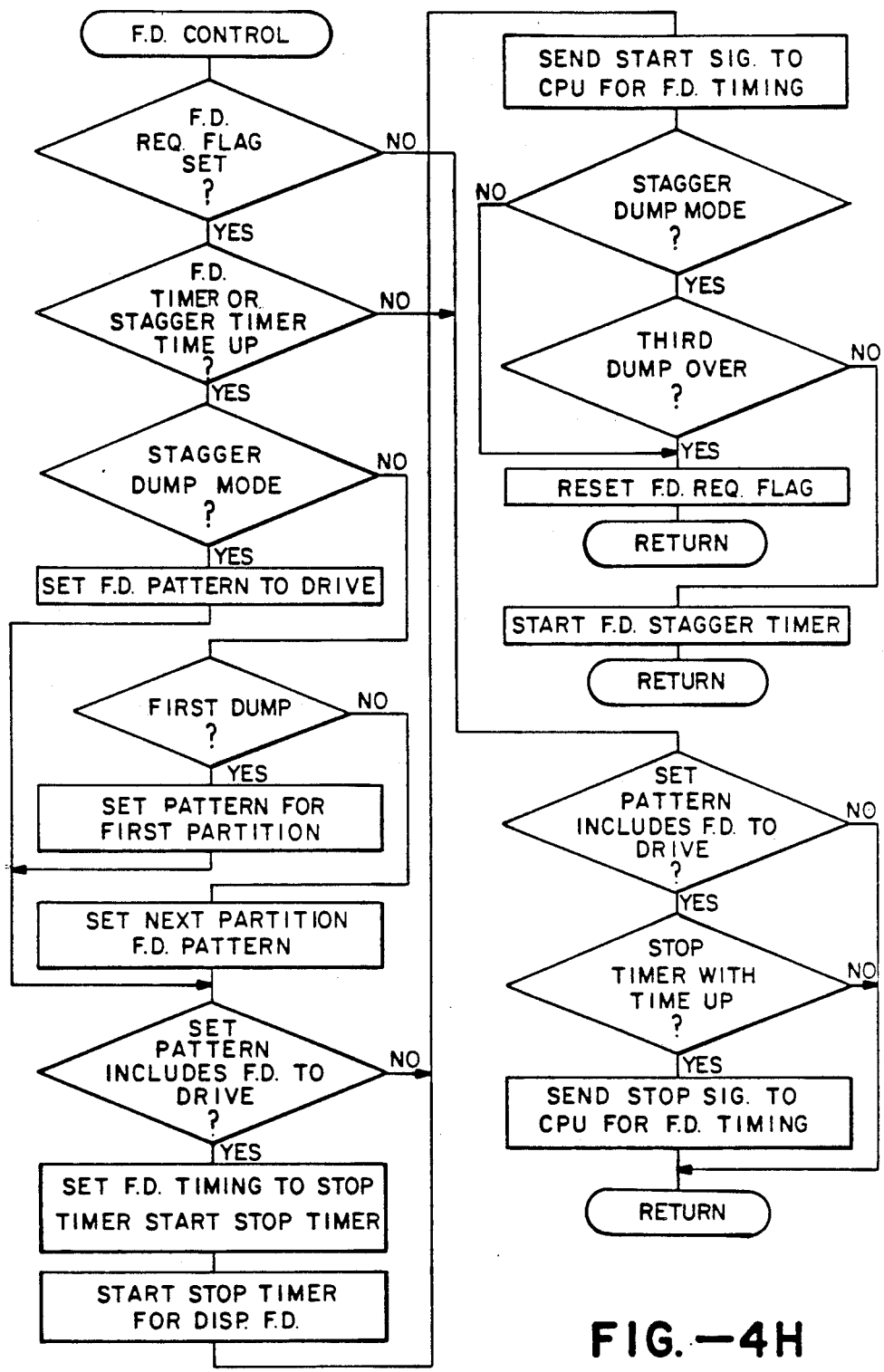
FIG.—4H

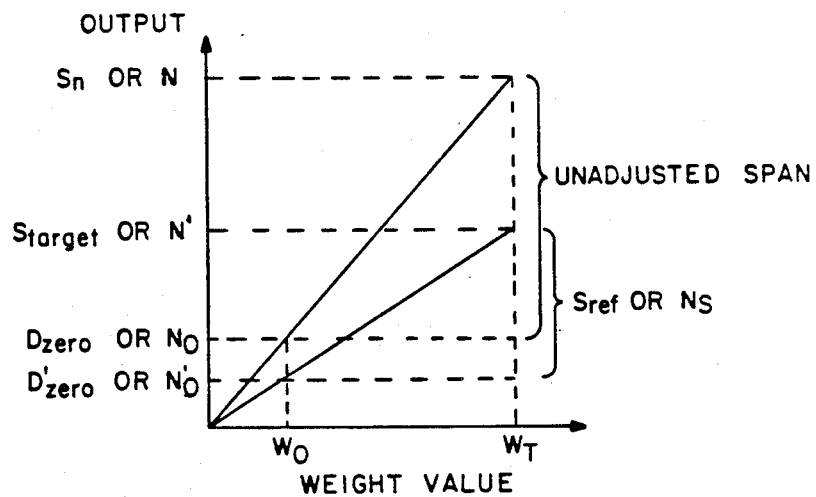
FIG.—5
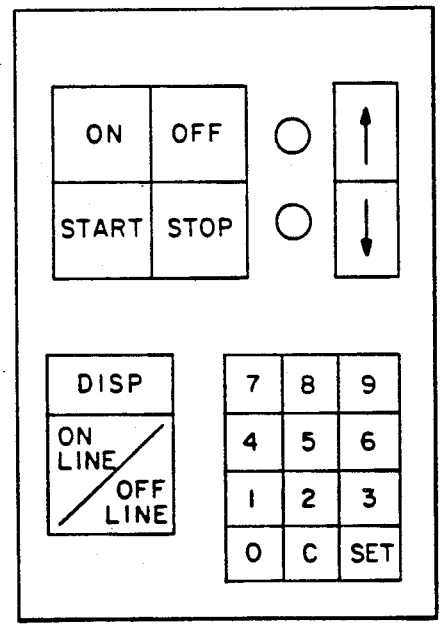
FIG.—6

ZERO-POINT ADJUSTMENT OF WEIGHING DEVICE

This is a division, of application Ser. No. 094,119 filed Sept. 4, 1987, U.S. Pat. No. 4,771,836 which was a division of Ser. No. 06/772,244, Sept. 3, 1985, U.S. Pat. No. 4,694,920.

This invention relates to zero-point adjustment of a weighing device and more particularly to a zero-point adjustment unit for More particularly, it relates to a combinational weighing system having at least three microcomputers in its control unit for monitoring weight data, driving the means for delivering the articles to be weighed, performing combinational computations and controlling the operation of the system.

Combinational weighing means weighing articles by a plurality of weighing devices, performing arithmetic operations for combinations of measured weight values and then selecting a combination according to a predetermined criterion. The major features of combinational weighing are great accuracy and high throughput. U.S. Pat. No. 4,398,612 issued Aug. 16, 1983 and assigned to the present assignee, for example, discloses an automatic weighing system of a combinational weighing type having a number of article batch handling units arrayed radially. Articles to be weighed are typically transported by a conveyor and dropped onto an article feeding unit which distributes them into the individual article batch handling units. Weight-measuring means associated with the individual article batch handling units are electrically connected to a control system such as a computer. The computer not only computes combinations of weight values obtained from these weight-measuring means and selects a combination according to a predetermined criterion such as the combination which gives a total weight that is within a preselected range, but also discharges the article batches from these selected article batch handling units for packaging.

Systems according to the invention disclosed in U.S. Pat. No. 4,398,612 such as Models CCW-201RLC and CCW-211RLC manufactured and sold by the assignee corporation have revealed the desirability of certain improvements. Regarding their control units, in particular, it is found desirable to generally improve the system flexibility and to introduce simpler methods of effecting zero-point and span adjustment on the weighing means. An easier input unit is also desirable by which even a relatively inexperienced user can operate the system in a variety of modes.

It is therefore an object of the present invention to provide a combinational weighing system with a control unit which is flexible and enjoys an increased degree of freedom in adjusting and controlling this system.

It is another object of the present invention to provide a combinational weighing system with a control unit which allows the user to efficiently perform zero-point and span adjustments of the weighing means in the system.

It is a further object of the present invention to provide a combinational weighing system with an input-output unit which enables even a relatively inexperienced user to efficiently perform a great variety of available functions of the system without increasing the probability of committing operational errors or necessitating the use of an operational manual.

It is a still further object of the present invention to provide an input-output unit for a combinational weighing system such that the scope of operation can be varied, depending on the qualification of the user.

In general, the present invention provides a combinational weighing system of the type having a plurality of separate article batch handling units which are adapted to receive individual article batches, to measure their weights, to output analog weight signals and to selectively discharge the measured article batches in response to a discharge signal. Its control unit includes at least three central processing units such as microcomputers individually for weight-monitoring, drive-controlling and combination computation purposes. The weight-monitoring computer is adapted to receive the weight signals and to calculate and store batch weight values indicative of the weights of the individual article batches. The drive-control computer is adapted to receive an article batch discharge signal and to cause the article batch handling units to selectively discharge article batches according to the article batch discharge signal. The combinational computation computer is not only used for combinational computation but is also adapted to control the overall operation of the system. The weight-monitoring part of the control system includes circuits for both rough and fine zero-point adjustment so that not only fine adjustment but also rough adjustment can be effected automatically. Span adjustment is also made easier by a method which provides a target output value according to which an analog-to-digital converter is adjusted.

Figure 1C:
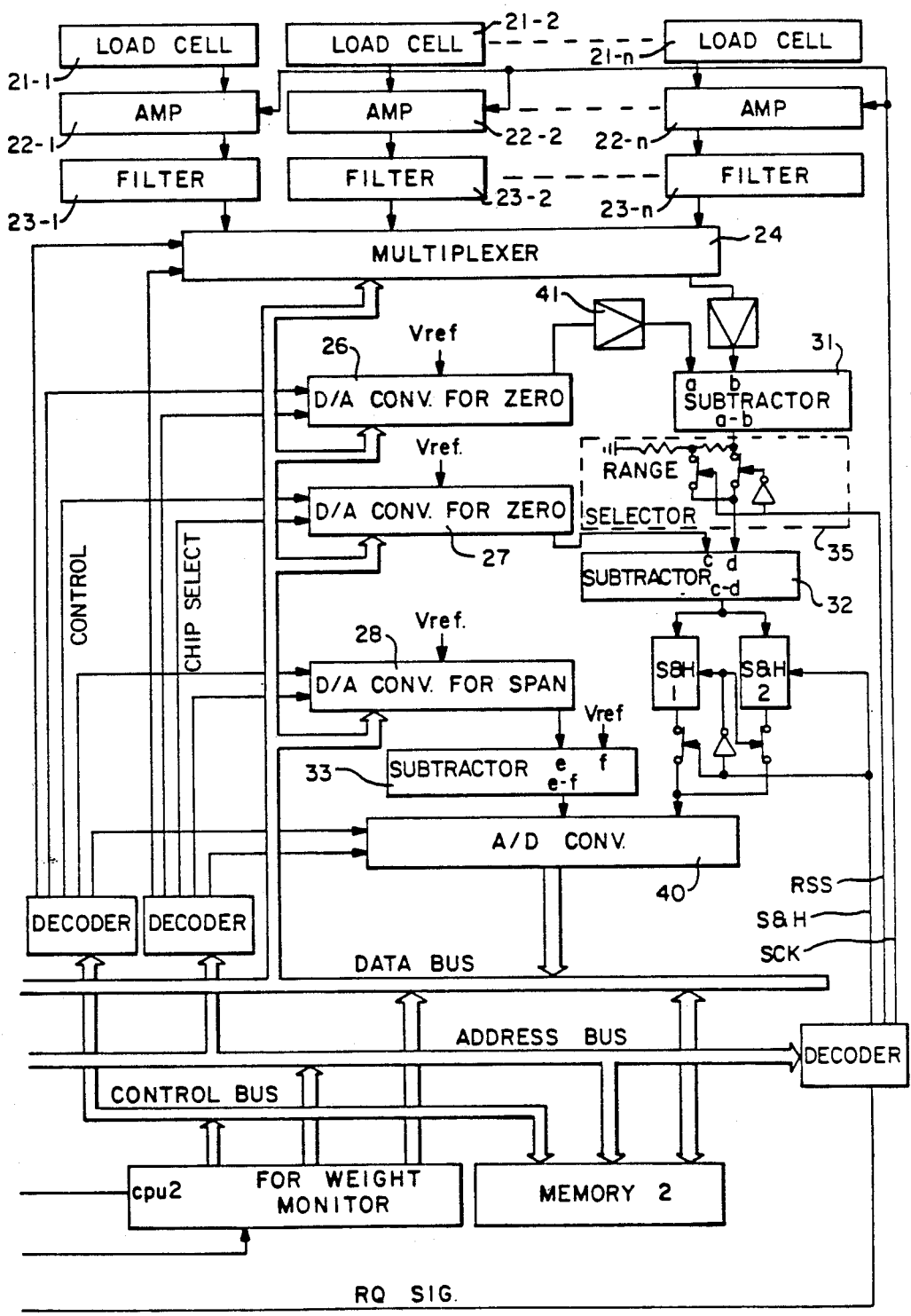
Figure 2D:
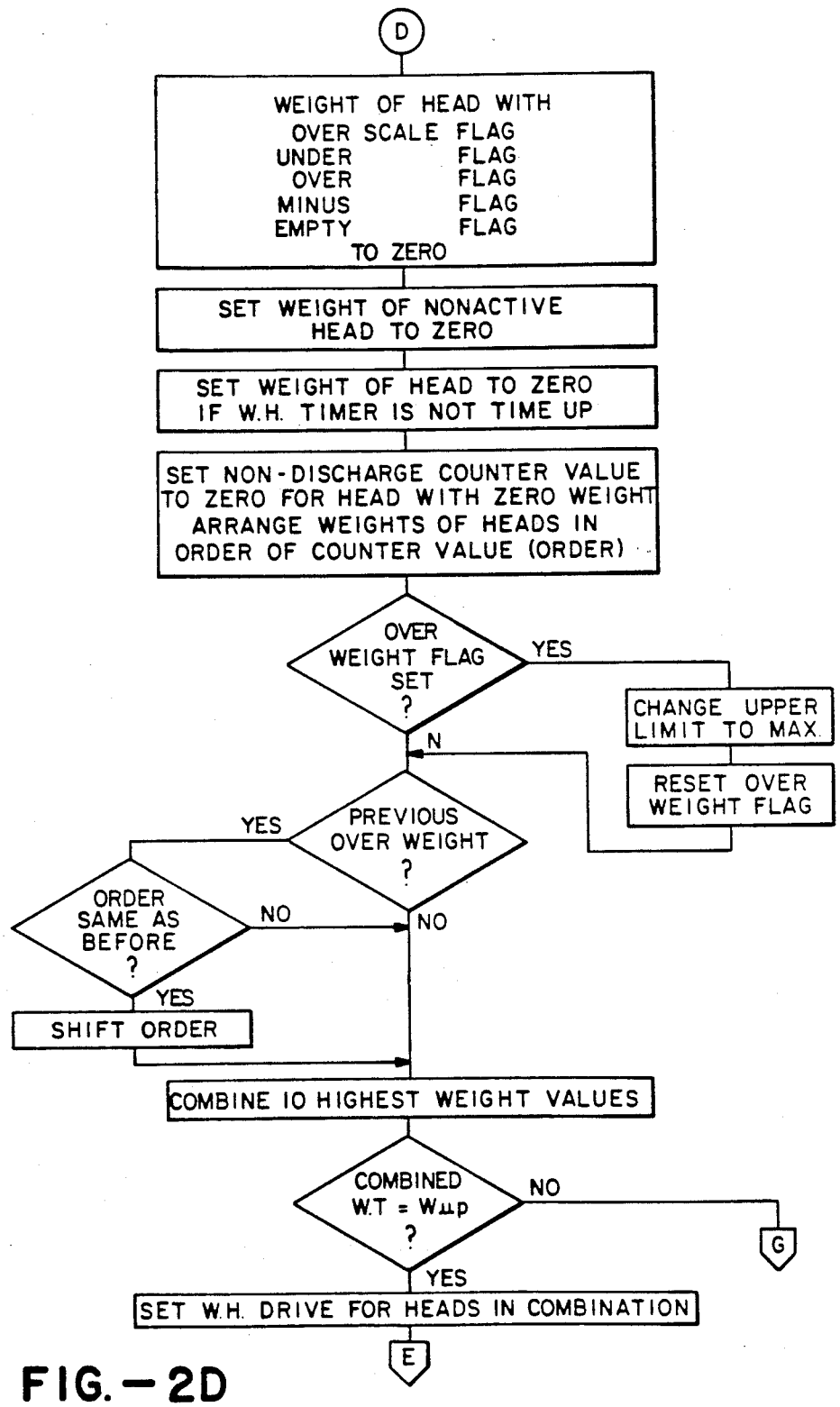
Figure 2E:
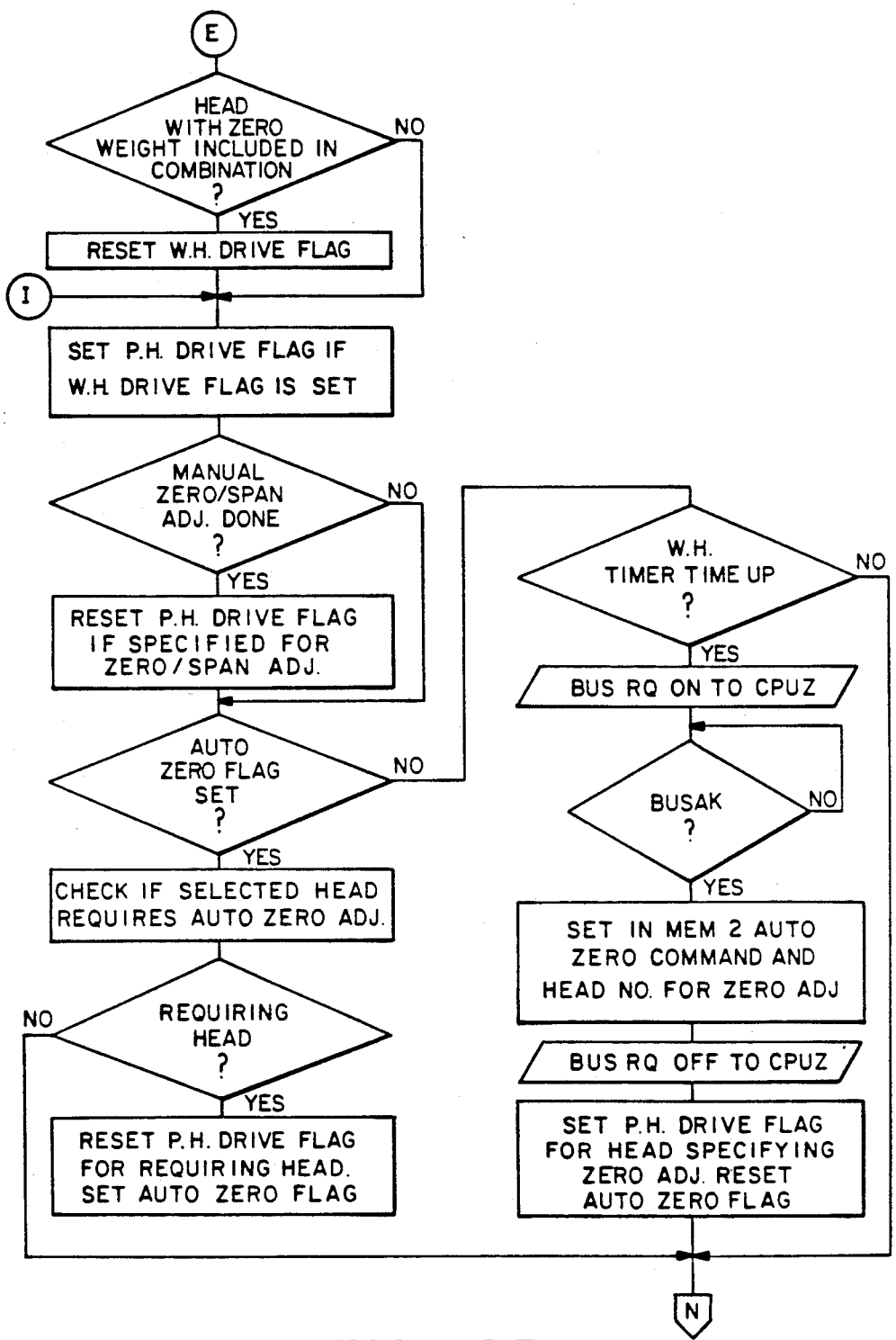
Figure 3A:
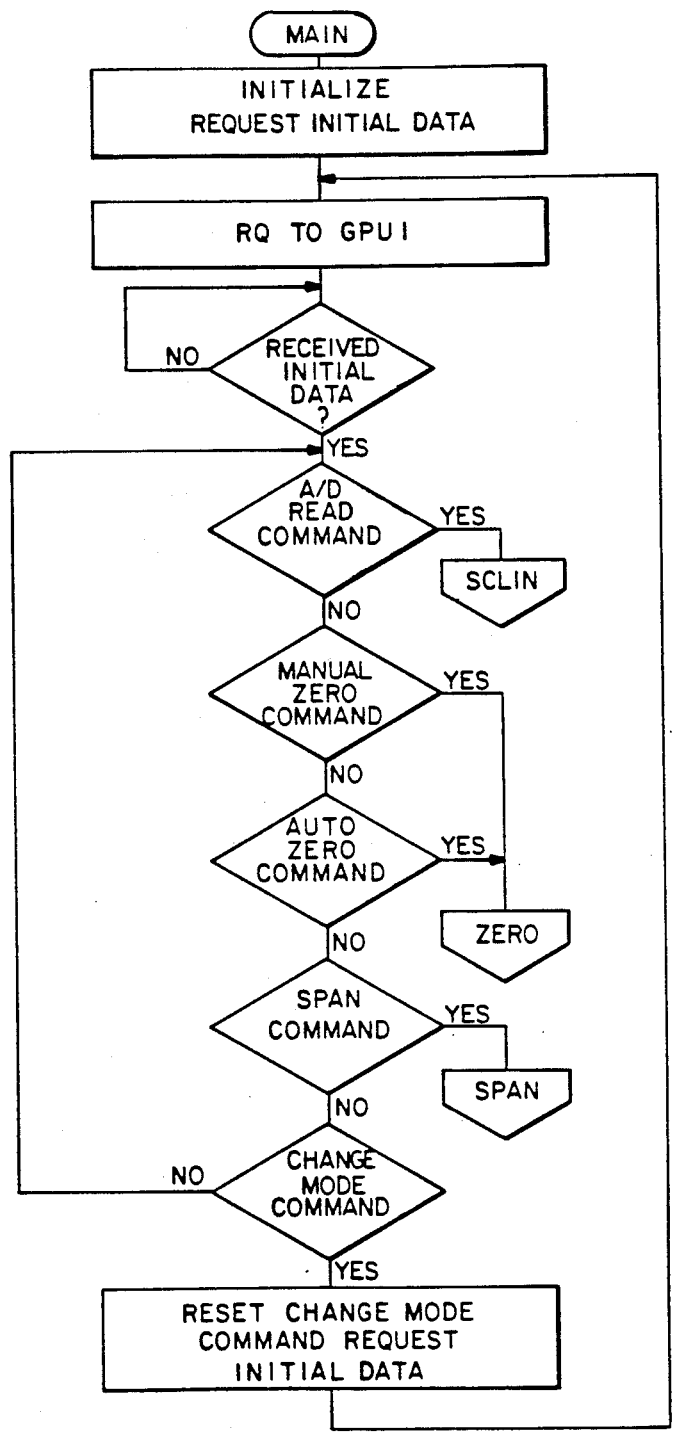
Figure 3E:
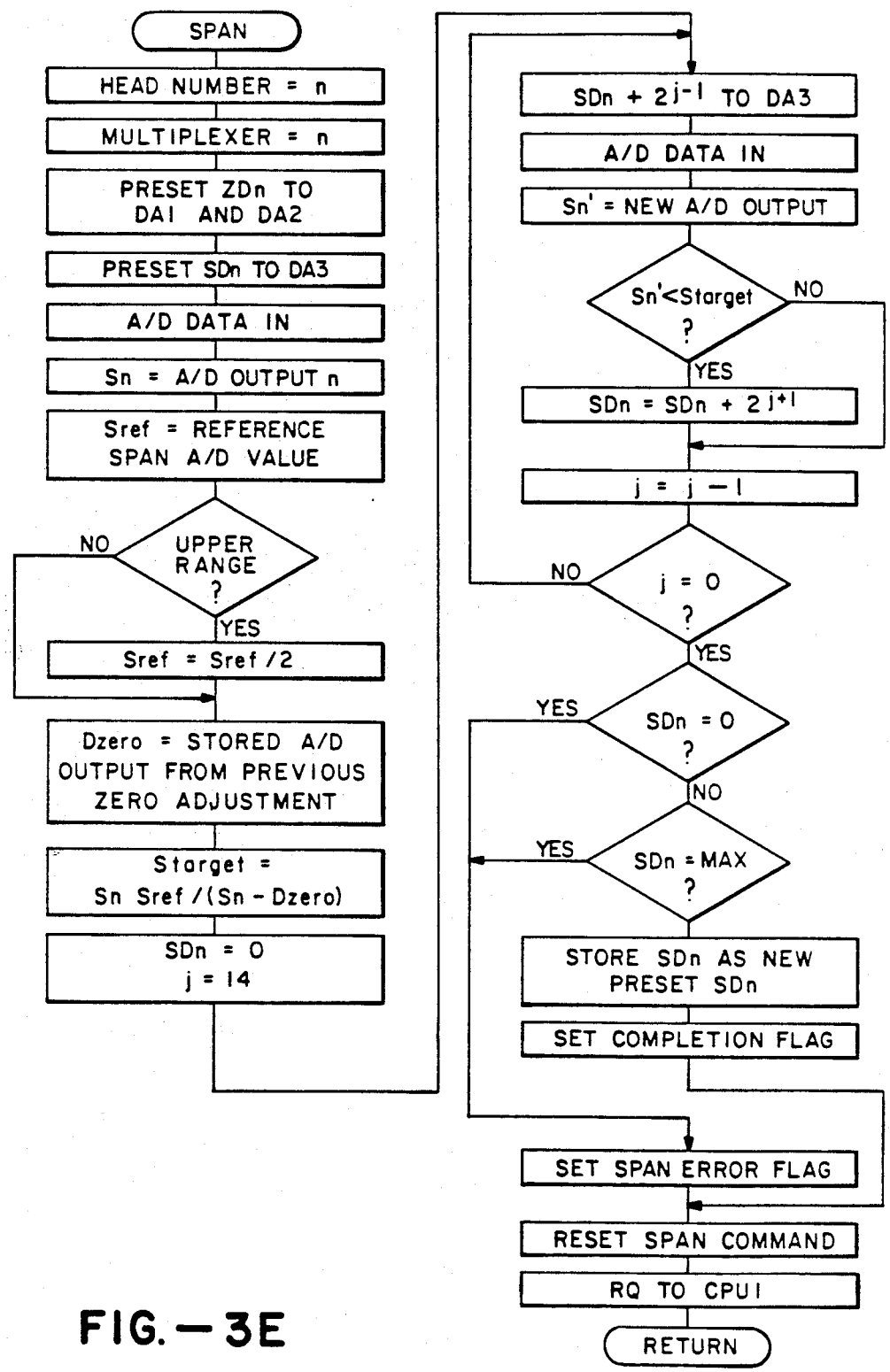
Figure 4F:
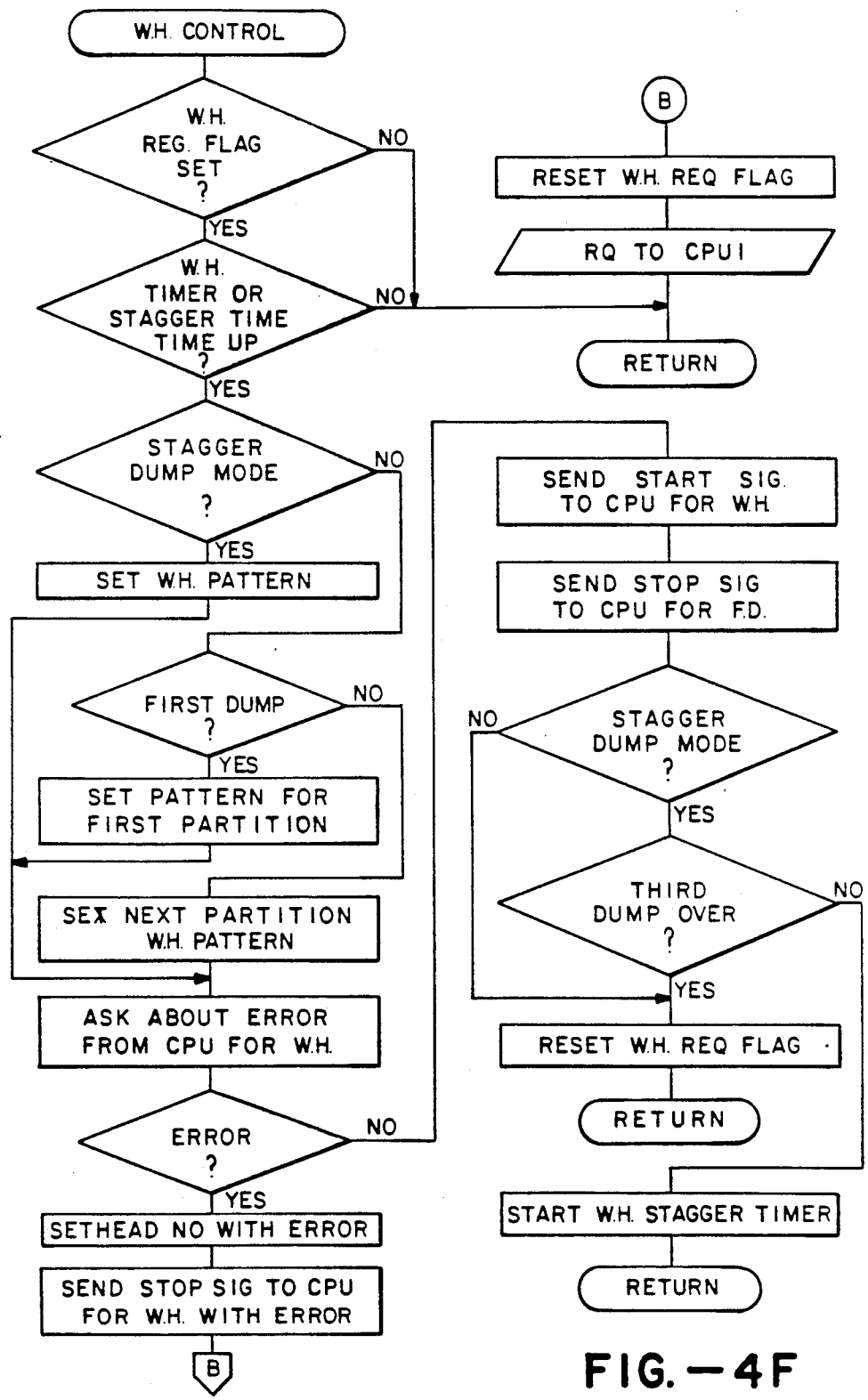
Figure 4I:
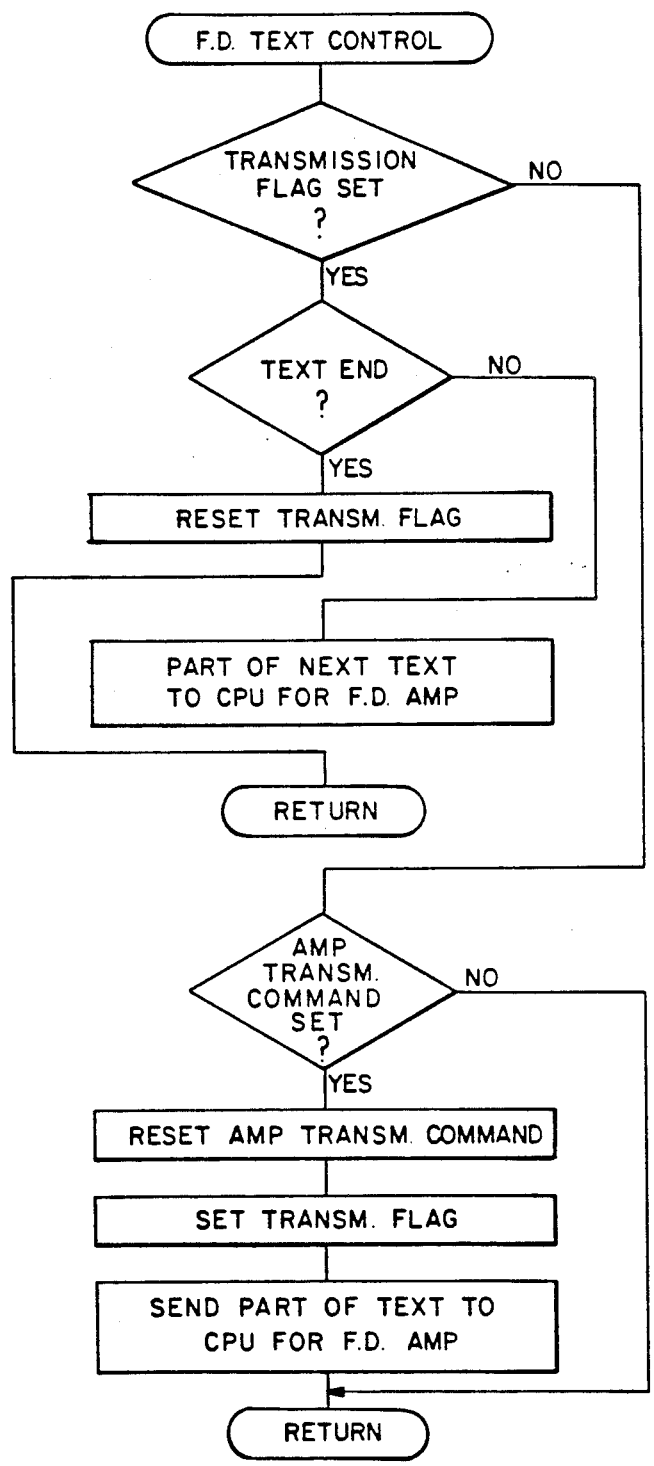

The accompanying drawings, which are incorporated in and form a part of the specification, illustrate one embodiment of the present invention and, together with the description., serve to explain the principles of the In the drawings:

FIG. 1A-1C is a block diagram of a control unit according to on embodiment of the present invention for a combinational weighing system, FIG. 2A-2G is a chart of the calculation computer in the control unit of FIG. 1, FIG. 3A-3E is chart of the weight-monitoring computer in the ocntrol unit of FIG. 1, FIG. 4A-4I is a chart of the drive-control computer in the control unit of FIG. 1, FIG. 5 is a drawing for explaining the principle of span adjustment, and FIG. 6 is a schematic front view of a control panel.

FIG. 1 is a block diagram of a control unit according to one embodiment of the present invention for a combinational weighing system which comprises an article feeding means and a plurality (n-number) of article batch handling units, the article feeding means being adapted to transport articles to be weighed and to distribute them to the individual article batch handling units as article batches, and each article batch handling unit being adapted to receive, store, weigh and discharge the delivered article batch and to output an analog weight signal representing the measured weight value.

The control system according to this embodiment substantially consists of three sections which will hereinafter be referred to as the weight-monitoring section, the main section and the drive-control section. These sections are indicated in FIG. 1 by arrows and one of the important features of the present invention is that each section has at least one central processing unit (CPU) such as a microcomputer of its own. This means that the control system according to this invention is of a multi-computer structure so that many adjustments and a great variety of operational modes can be made available.

The three most important CPUs according to the embodiment of FIG. 1 are indicated therein as CPU1, CPU2 and CPU3 belonging respectively to the main, weight-monitoring and drive-control sections. For the convenience of subsequent explanations, they will also be referred to as the main (or calculation) computer, the weight-monitoring computer and the drive-control computer, respectively. Explained briefly, the weight-monitoring computer CPU2 is adapted to monitor and store the weight information on the article batches from the article batch handling units and the weight-monitoring section, cooperating with the weight-monitoring computer CPU2, not only receives weight value signals and processes them to be stored but also performs zero-point adjustment and span adjustment of the weighing devices; the drive-control computer CPU3 is adapted to output driving signals and the drive-control section, cooperating with the drive-control computer CPU3, not only drives the individual article batch handling units selectively but also controls the feeding of articles thereinto; and the main computer CPU1 is adapted to perform combinational computations to select a particular combination of the article batch handling units according to the measured weight values outputted therefrom and also to generally control the operation of the weight-monitoring and drive-control computers CPU2 and CPU3, and the main section, cooperating with the main computer CPU1 and including therein a remote control input-output unit to be described below, allows the user to control the operation of the entire system, for example, by choosing a mode. Flow charts of these computers CPU1, CPU2 and CPU3 are shown in FIGS. 2, 3 and 4, respectively.

Each of the aforementioned computers CPU1, CPU2 and CPU3 has associated therewith a random access memory means. These memory means are indicated in FIG. 1 respectively as MEMORY1, MEMORY2 and MEMORY3 (and as MEM1, etc. in the Figures). In what follows, the aforementioned three sections will be described one by one more in detail, starting with the weight-monitoring section.

As explained above, the weight-monitoring section is adapted to receive analog weight data (signal) from the article batch handling units and to process them for storage as digital data. In addition, this section is used for the zero-point adjustment and span adjustment of the weighing devices in the article batch handling units. In FIG. 1, numerals 21-1 . . . 21-n denote n weight-measuring devices such as load cells, each being a part of one of the weighing devices in the article batch handling units. Numerals 22-1 . . . 22-n denote n amplifiers each of which has its input side connected to the output terminal of the corresponding one of the weight-measuring devices 21-1 . . . 21-n. The amplifiers 22-1 . . . 22-n produce respective amplified output signals indicative of the weight values obtained by the weighing devices. These amplified signals are inputted through respective filters 23-1 . . . 23-n to a multiplexer 24 of a known type, comprising analog switches or the like, and are delivered sequentially therefrom as output signals in response to a weight value read signal transmitted from the weight-monitoring computer CPU2.

The weight-monitoring section further includes two 8-bit digital-to-analog converters 26 and 27 respectively for rough and fine zero-point adjustment and a 14-bit digital-to-analog converter 28 for span adjustment. These digital-to-analog converters 26, 27 and 28 will also be referred to as DA1, DA2 and DA3 for convenience. In addition, there are three subtractors 31, 32 and 33 (or SUB1, SUB2 and SUB3) respectively for rough and fine zero-point adjustment and span adjustment. The subtractor for rough zero-point adjustment 31 (or SUB1) is connected to the digital-to-analog converter 26 (or DA1) to receive analog signals outputted therefrom. Similarly, the subtractor for fine zero-point adjustment 32 (or SUB2) is connected to the digital-to-analog converter 27 (or DA2) to receive analog signals outputted therefrom. As will be explained later, the digital-to-analog converter and subtractor for rough zero-point adjustment are so called because they are used for rough zero-point adjustment of the weighing devices and the circuit of which they ar parts may be referred to as the rough zero-point adjustment circuit. Similarly, the circuit of which the digital-to-analog converter and subtractor for fine zero-point adjustment are parts may be referred to as the fine zero-point adjustment circuit and the circuit including the digital-to-analog converter for span adjustment 28 (or DA3) and the subtractor for span adjustment 33 (or SUB3) connected so as to receive analog signals outputted therefrom may be referred to as the span adjustment circuit.

On the output side, the multiplexer 24 is connected to the subtractor for rough zero-point adjustment 31 which is connected to a range selector 35 on its output side. The range selector 35 is for selecting a maximum weight (range) allowed to be measured. As shown in FIG. 1, the range selector 35 is composed of a potential divider and a switch. The switch is adapted to be operated by a range selection signal RSS outputted from the weight-monitoring computer CPU2 for selecting one of two choices UPPER RANGE and LOWER RANGE. UPPER RANGE is twice as wide as LOWER RANGE according to this embodiment. Signals outputted from the range selector 35 are inputted to the subtractor for fine zero-point adjustment 32. On the output side, the subtractor for fine zero-point adjustment 32 is connected to an analog-to-digital converter 40 through two sample-and-hold circuits S&H1 and S&H2 which are connected in parallel, each having a switch on its output side. The weight-monitoring computer CPU2 is adapted to output a sample-and-hold signal S&H to operate these switches substantially in synchronism with signals to the multiplexer 24 and to the analog-to-digital converter 40. Since there is an inverter means provided on the signal paths to one of the sample-and-hold circuits (S&H2 in FIG. 1), signals outputted from the multiplexer 24 (through the subtractors SUB1 and SUB2) are efficiently processed in such a way that while a signal is being sampled by one of the sample-and-hold circuits, another signal is held in the other. The advantage of using two sample-and-hold circuits, therefore, is that the analog-to-digital converter 40 can be more efficiently utilized because it generally takes several tens of microseconds to charge a circuit capacitor for increasing the sampling accuracy and the analog-to-digital converter would not be functioning during such charging if only one sample-and-hold circuit were used. According to another embodiment, sample-and-hold circuits may be so arranged that two or more signals from a weighing device are sampled before the multiplexer switches to another weighing device.

Numeral 41 indicates a voltage level shifter, the purpose of which is to create a predetermined voltage ratio such as 128:1 between the voltages inputted to the subtracters for zero-point adjustment 31 and 32 corresponding to the input of the least significant bit. This being the purpose of the level shifter 41, another voltage level shifting means may be inserted in the fine zero-point adjustment circuit to be used either in addition to or instead of the aforementioned voltage level shifter 41.

The drive-control section, another of the three sections of which the control unit of the present invention consists, is for driving the article feeding means and the article batch handling units in response to a command which is received from the main computer CPU1 by the drive-control computer CPU3 belonging to this section. FIG. 1 includes a block diagram of the drive-control section of the present invention according to on embodiment which is adapted to controllably drive a combinational weighing system of the type generally described in U.S. Pat. Nos. 4,494,619, 4,497,385 and 4,499,961 all assigned to the present assignee. Explained more in detail, it will be assumed hereinafter not only that the combinational weighing system under consideration comprises an article feeding means and a plurality (n-number) of article batch handling units as described above but also that the article feeding means includes a vibratable dispersion feeder (abbreviated as DISP. FD.) and n independently vibratable radial feeders (abbreviated as RAD. FD.) such as troughs for the radially arrayed individual article batch handling units and that each article batch handling unit includes a pool hopper (abbreviated as P.H.) for receiving an article batch from the associated radial feeder, a weigh hopper (abbreviated as W.H.) for weighing the article batch discharged thereinto from the associated pool hopper. In addition, a timing hopper (abbreviated as T.H.) is also allowed to be a part of the system for receiving article batches from the weigh hoppers and discharging them in turn. The pool hoppers, weigh hoppers and timing hopper are adapted to open and close at predetermined time intervals and the mechanisms for controlling the timing of their opening and closing are referred to as pool hopper timers, weigh hopper timers and timing hopper timer. The abbreviations shown above are used extensively in the drawings and flow charts for convenience.

The drive-control section of this invention is characterized in that n computers 51-1. . . 51-n for controllably driving the individual article batch handling units are connected in parallel to the drive-control computer CPU3 through interface means.

For convenience, these parallel-connected computers 51-1. . . 51-n will be referred to as hopper driving computers. If the combinational weighing system is of the type which employs a timing hopper as a part of an article collecting unit below the article batch handling units, the drive-control section may further include a timing hopper driving computer 52 connected also in parallel with the aforementioned hopper driving computers 51-1. . . 51-n.

These hopper driving computers 51-1. . . 51-n are individually connected to hopper drivers 54-1. . . 54-n, each of which may typically include clutches and brakes for controlling the motion of a pool hopper for receiving an article batch and a weigh hopper for weighing it. Similarly, a timing hopper driver 55 for controlling the motion of the timing hopper is connected to the timing hopper driving computer 52. In such a case, a signal to the packaging unit PU associated with the combinational weighing system may be outputted from the timing hopper driver 55. After packaging is done, the packaging unit PU outputs a signal which is delivered to the main computer CPU1 through the drive-control computer CPU3 as will be described more in detail below.

The drive-control section of this embodiment also includes computers 56 and 57 which are for controlling the vibration timing and intensity, respectively, of the dispersion and radial feeders. For the sake of convenience, they will be hereinafter referred to as the timing computer and intensity (or amplitude) computer, respectively. A dispersion feeder driver 58 for controlling the vibratory motion of the dispersion feeder and n radial feeder drivers 59-1. . . 59-n for controlling the vibratory motion of the radial feeders are connected both to the timing and intensity computers 56 and 57. Vibration intensity (or amplitude) is changed by controlling the power to be supplied to the motor for causing the vibration, and this is accomplished by using a zero cross detector 60 to detect the zero-points of an AC power source and using a solid state relay to switch on the motion with a predetermined delay after a detected zero cross point. In other words, the intensity computer 57 controls the intensity of vibrations by regulating the delay between a zero-point detected by the zero cross detector 60 and the switch-on time for starting the vibratory motion.

The main section, the third of the three sections of which the control unit of the present invention consists, includes the main computer CPU1 and an input-output unit by means of which the user can select a mode of operation. As shown in FIG. 1, the input-output unit includes both input means such as a keyboard (KEYS) and output means such as a displayer (DISPLAY) and a printer (PRINTER) in addition to a microcomputer for remote control (referred to as CPU4). Details of the input-output unit as well as a program for the remote control computer CPU4 will be described after reference is made first to the flow charts of FIGS. 2, 3 and 4 to explain how the three basic computers CPU1, CPU2 and CPU3 of the control unit perform their intended functions.

As can be seen in the main programs (MAIN) in these charts, the weight-monitoring computer CPU2 and the drive-control computer CPU3 are programmed to output a request signal RQ to the main computer CPU1 ("RQ TO CPU1" in FIGS. 3 and 4) to solicit a command. When the weight-monitoring computer CPU2 sends this request signal after initializing and setting a flag for requesting initial data ("INITIALIZE" in FIG. 3), the main computer CPU1 outputs to the weight-monitoring computer CPU2 a bus request signal BUSRQ to request that the necessary bus line be opened ("BUSRQ ON TO CPU2" in FIG. 2). When the bus request signal BUSRQ is received, the weight-monitoring computer CPU2 automatically sets a tristate logic device in a high-impedance state to activate a bus acknowledge signal BUSAK, thereby informing the main computer CPU1 that the required bus line has been opened. When the bus acknowledge signal BUSAK is detected ("BUSAK?" in FIG. 2), the main computer CPU1 checks whether the weight-monitoring computer CPU2 is requesting initial data and, if a flag for requesting initial data is detected, transfers the initial data from MEMORY1 to MEMORY2 ("TRANSF. INITIAL DATA FROM MEM1 TO MEM2"). Subsequently, the RQ signal from the weight-monitoring computer CPU2 is reset ("RESET RQ" in FIG. 2) and a signal is outputted to the weight-monitoring computer CPU2 to release (cancel) the bus request ("BUSRQ OFF TO CPU2"). When the latter signal is received, the weight-monitoring computer CPU2 releases the BUSAK signal and automatically resumes the processing of its program, checking whether the initial data have been received. ("RECEIVED DATA? "). If initial data have been set in MEMORY2, the weight-monitoring computer CPU2 checks whether a command to read an output from the analog-to-digital converter 40 has been set ("A/D READ COMMAND" in FIG. 3). This command, however, is not set by the main computer CPU1 but by an interrupt signal outputted periodically from an independent timer at a fixed frequency. Thus, the program according to the subroutine SCLIN is adapted to be repeated periodically at a fixed frequency in order to constantly update the weight information from the weighing devices 21-1 . . . 21-n as will be explained below. By contrast, "manual zero", "auto zero", "span" and "change mode" commands are set by the main computer CPU1. As shown in FIG. 2, these commands are inputted to the weight-monitoring computer CPU2 by exchanging aforementioned signals BUSRQ and BUSAK between the two computers and by writing these commands in MEMORY2. Thus, the BUSRQ signal from the main computer CPU1 functions as a kind of interrupt signal. Similarly, if the input data transferred from the remote control computer CPU4 to the main computer CPU1 are for modifying the initial data, a change mode command is set to the weight-monitoring computer CPU2 in the same manner as explained above. When the weight-monitoring computer CPU2 finds that a change mode command has been set ("CHANGE MODE COMMAND" in FIG. 3), it resets the command, sets a flag to request new data ("RESET CHANGE MODE COMMAND. REQUEST INITIAL DATA") and returns to the beginning of the MAIN program.

The subroutine SCLIN (=scale data in), as shown in FIG. 3 for a system with fourteen article batch handling units, substantially consists of a loop (returning from the point "D"), each cycle relating to one of the weighing devices in the individual article batch handling units. When the SCLIN is called, the aforementioned command to read the outputs from the analog-to-digital converter 40 is reset ("RESET A/D COMMAND") and a signal RSS explained above and shown in FIG. 1 is outputted to the range selector 35 to select one of the available ranges ("OUTPUT RSS"). Next, the multiplexer input port number n (a dummy index in this case, not the number of article batch handling units in the system) is set to 1, or the "first" weighing device to be considered in the aforementioned loop is specified ("n=1" and "MULTIPLEXER=n") so that the multiplexer 24 will output the weight signal from the "first" weighing device.

Next, a zero atum (or a zero-point adjustment preset value $ZD_n$ related to the nth weighing device, to be explained more fully later in connection with the subroutine ZERO, is inputted to the digital-to-analog converters for zero-point adjustment DA1 and DA2 and a span datum (or space adjustment preset value) $SD_n$ related to the nth weighing device and to be explained more fully later in connection with the subroutine SPAN, is inputted to the digital-to-analog converter for span adjustment DA3. Both $ZD_n$ and $SD_n$ are digital values and stored in MEMORY2. Thereafter, a signal S&H is outputted to the sample-and-hold circuits ("SET S&H") and a starting signal is sent to the analog-to-digital converter 40 ("START TO A/D CONV") to start the first cycle of the aforementioned loop. The S&H signal is for selecting one of the two sample-and-hold circuits to sample while the other holds when it is set. When it is reset, the two sample-and-hold circuits exchange their holes, the sampling circuit beginning to hold and the holding circuit beginning to sample. As explained above, the setting and resetting of the sample-and-hold circuits are carried out in synchronism with the sending of a starting signal to the analog-to-digital converter 40 and reading an output therefrom. These three steps are sometimes combined in FIG. 3 and denoted as "A/D DATA IN".

Because fluctuations are inevitable in measurements, the subroutine SCLIN does not rely on a single reading but allows the user to choose whether 2 or 4 output data from the analog-to-digital converter 40 should be considered to obtain an average value $D_{ave}$. Inside the aforementioned loop, a first of these 2 or 4 output data is read ("READ A/D OUTPUT1") and stored in $D_{sum}$ ("$D_{sum}$=OUTPUT1"). In preparation for the input of the next output datum, a reset signal is sent to the sample-and-hold circuits and a start signal to the analog-to-digital converter 40 in synchronism. The information whether 2 or 4 output data should be considered to calculate an average is one of the initial data mentioned above. If the answer to the question "2 TIMES?" is "NO", it means that 4 output data are considered to calculate the average value and the weight-monitoring computer CPU2 proceeds to read a second output datum for the analog-to-digital converter 40 ("READ A/D OUTPUT2") and adds this value to that of the first output datum now stored in $D_{sum}$, the sum being re-stored in $D_{sum}$ ("$D_{sum}=D_{sum}$ +OUTPUT2"). A similar step including setting or resetting of the sample-and-hold circuit and starting of the analog-to-digital converter 40 is repeated to read a third output and a fourth output and add them to the sum in $D_{sum}$. If the answer to the question "2 TIMES?" is "YES", only two outputs are added in $D_{sum}$. The value stored in $D_{sum}$ is subsequently divided by 2 once (if the response to "2 TIMES?" is "YES") or twice (if this response is "NO") to obtain a desired average value $D_{ave}$.

In the subsequent several steps, the weight-monitoring computer CPU2 examines if the fluctuation in this measured value is converging or not. For this purpose, the value of $D_{ave,n}$ (the value of $D_{ave}$ for the nth weighing device) obtained previously is read from MEMORY2 and set as $P_{ave}$ also ("PREVIOUS $D_{ave,n}$ TO $P_{ave}$") and a predetermined maximum allowable deviation (inputted originally as one of the initial data) is inputted as $D_{dev}$ ("$D_{dev}$=DEVIATION VALUE"). If the absolute value of the difference between $P_{ave}$ and $D_{ave}$ is not smaller than $D_{dev}$, the newly derived value $D_{ave}$ is stored as $D_{ave,n}$ ("$D_{ave,n}=D_{ave}$") for use in the subsequent steps. If otherwise, a three-to-one weighed average between $P_{ave}$ and $D_{ave}$ is stored instead as $D_{ave,n}$. This is to give more weight to the previously stored value (or to find the previously stored value more trustworthy) if the new value deviates from it significantly.

Thereafter, an appropriate flag is set according to the value of $D_{ave,n}$. The under flag, over flag, minus flag, empty flag and stability flag are initially reset. The under flag is set if $D_{ave,n}=0$, and the over flag is set if $D_{ave,n}$ is greater than a predetermined maximum value.

At this stage, the dummy index n is replaced by n+1 ("n=n+1"), the multiplexer is addressed to the newly set value n, and the zero-point and span adjustment preset values addressed to the new (previously (n+1)st and now the nth) weighing device are respectively inputted to the digital-to-analog converters for zero-point and span adjustments, respectively, as done before at the beginning of this subroutine. The reason for entering these values for the next weighing device at this point rather than at the end of this loop is that it generally takes a relatively long time to read and input these data.

Thereafter, accordingly, the value $D_{ave,n}$ obtained immediately above must be referred as $D_{ave,n-1}$ and the minus flag is set if a stored output value from the analog-to-digital converter 40 at the previous zero-point adjustment (Dzero to be explained in detail later in connection with the subroutine ZERO) is subtracted from $D_{ave,n-1}$ to obtain a net weight value $NET_{n-1}$ and if this value is negative. The empty flag is set if $NET_{n-1}$ is smaller than the empty weight In the subsequent few steps, the net weight value $NET_{n-1}$ is normalized by dividing or multiplying it by an appropriate normalization factor to obtain a weight value $W_{n-1}$. For example, if 10 digital counts correspond to 5g, the NET value might be divided by 2 ("Wn-1=NETn-½"). Since the normalization factor depends on how the range selector 35 has been set, a question is asked which of the choices has been made ("UPPER RANGE?"). If 10 digital counts actually turn out to correspond to 2.5 g, the value of $W_{n-1}$ obtained above must be divided further by 2 ("Wn-1=Wn-½") to obtain a correct weight value $W_{n-1}$.

At this point, the weight-monitoring computer CPU2 determines whether the fluctuation in the weight data from this weighing device has stabilized. For this purpose, the previously stored value of $D_{ave,n-1}$ is taken out of MEMORY2 as $P_{ave,n-1}$ and the absolute value of the difference between $P_{ave,n-1}$ and $D_{ave,n-1}$ is computed and defined as DIF. If DIF is not smaller than a predetermined stability range SR, the stability flag is not set. If DIF is smaller than SR, it is considered that stability has been established. The user is required to decide initially whether a single comparison of $D_{ave,n-1}$ with $P_{ave,n-1}$ is sufficient to establish stability or a further comparison with a penultimate stored average value $P'_{ave,n-1}$ is required. This information (entered as initial data) is checked ("TWICE COMPARISON MODE?") and $D_{ave,n-1}$ is accordingly compared only once with $P_{ave,n-1}$ or twice with $P_{ave,n-1}$ and $P'_{ave,n-1}$. The stability flag is set if stability is deemed to have been established by either criterion. At the end, a set signal is sent to the sample-and-hold circuits and a start signal is outputted to the analog-to-digital converter 40 to close the loop. This loop is repeated as many times as the number of weighing devices or article batch handling units in the system.

The subroutine ZERO is called as explained above by a manual zero command or an auto zero command. Thus, the zero-point adjustment can be effected either on only one of the weighing devices by specifying the particular one or on all of them. Before reference is made to the flow chart of FIG. 3, the mechanism of zero-point adjustment according to this invention will be briefly outlined.

To perform a zero-point adjustment, the weighing device of interest is kept unloaded and the no-load weight value signal is introduced through the multiplexer 24 to the subtracter SUB1. Next, a 16-bit digital value previously stored as $ZD_n$ (corresponding to the nth weighing device under consideration) is fetched from MEMORY2 and its first (top or higher) 8 bits are inputted into the digital-to-analog converter for rough adjustment DA1 and the second (bottom or lower) 8 bits into the digital-to-analog converter for fine adjustment DA2. Similarly, a 14-bit digital value stored in MEMORY2 as $SD_n$ which is one-half of the maximum that can be inputted to the digital-to-analog converter for span adjustment 28 is inputted thereto. Since the digital-to-analog converter for span adjustment 28 is a 14-bit converter, the maximum value that can be inputted has 1 in every bit and the value inputted thereto in this step therefore has 1 only in the first (top or maximum) bit, all the other bits having 0. The output voltage from the digital-to-analog converter DA1 is also inputted to the subtracter SUB1 and the difference voltage signal outputted therefrom is inputted to the next subtracter SUB2 for fine adjustment. For the sake of explanation, let us hereinafter consider the mode of operation for which the range selector 35 does not cause any level shift in voltage and that the level shifter 41 is so set that the output voltage from the digital-to-analog converter DA2 per bit thereof, when entering the subtracter SUB2 for fine adjustment, will be 1/128 of that from the digital-to-analog converter DA1 when entering the subtracter SUB1 for rough adjustment. The output from the subtracter SUB2 is passed through the sample-and-hold circuits and the analog-to-digital converter 40 and is inputted to the weight-monitoring computer CPU2. This input signal is stored in MEMORY2 as the zero-point of this weighing device.

The level shifter 41 may be so set that the aforementioned ratio in per-bit output voltage will be $2^8=256$ instead of 128. It is preferable, however, to adjust the level shifter 41 and the range selector 35 (as well as any extra voltage shifter which may be inserted between the digital-to-analog converter DA2 and the subtracter SUB2 as mentioned before) in such a manner that the ratio of minimum controllable voltages (corresponding to the least significant bits) by the two zero-point adjustment digital-to-analog converters DA1 and DA2 will be $2^7$ rather than $2^8$. The reason for this preference, as will become easier to understand later, is that the maximum error that can be detected by the digital-to-analog converter DA2 for fine adjustment increases by a factor of 2, and this will prove to be a significant advantage when the system is operated in a mode wherein rough adjustment is omitted.

Reference being now made to the flow chart of the subroutine ZERO in FIG. 3, the mechanism of zero-point adjustment outlined above will be explained more in detail. After the head number n (a dummy index) is specified ("HEAD NO. n") and the multiplexer 24 is told to output the no-load weight signal corresponding to this weighing device ("MULTIPLEXER=n"), the aforementioned initial values $ZD_n$ and $SD_n$ are inputted to the digital-to-analog converters DA1, DA2 and DA3.

Since there is a total of 16 bits between the digital-to-analog converters for zero-point adjustment DA1 and DA2, the routine for determining the zero-point essentially consists of a 16-cycle loop. In preparation for this loop, a dummy variable j is set to 16 and $ZD_n$ to 0 ("ZDn=0, j=16"). Let us now define $B_1$ and $B_2$ each as an 8-bit number entered in the digital-to-analog converters DA1 and DA2, respectively, a 16-bit number B (representing $ZD_n$) being therefore defined as that having $B_1$ and $B_2$ as its top and bottom 8 bits. At the start of this loop, B ($=ZD_n$) is zero and hence both $B_1$ and $B_2$ are zero.

In the first step inside the loop, the weight-monitoring computer CPU2 outputs $(B+2^{j-1})$ to the digital-to-analog converters DA1 and DA2. In the first cycle, therefore, the inputted 8-bit values are $B_1 = (10000000)$ and $B_2 = (00000000)$. The digital value $Z_n$ which is then outputted from the analog-to-digital converter 40 is compared with a reference zero value $Z_{ref}$ stored in MEMORY2 ("$Z'_n < Z_{ref}$?"). If Z' is not less than $Z_{ref}$, B is replaced by $(B+2^{j-1})$ and j by (j−1). Since B was zero and j equaled 16 at the beginning of the first cycle, $B=2^{15}=(1000000000000000)$ and j=15 at the end of the first cycle. If Z' was less than $Z_{ref}$ in the first cycle, the aforementioned replacing step is skipped and B remains zero at the end of the first cycle.

This loop is repeated thereafter until j becomes zero ("j=0?"). If the value of $ZD_n$ at the end of the loop is zero or exceeds a certain maximum value ("$ZD_n=0$?" and "$ZD_n=MAX$?"), a zero error flag is set, a request signal RQ is outputted to the main computer CPU1 for the next command and the subroutine comes to an end. Otherwise, the top 8 bits of the binary code B is stored as the bias value for rough zero-point adjustment for this weighing device, the bottom 8 bits likewise for fine adjustment ("STORE ZDn AS NEW PRESET ZDn"), and the output weight value $D_{zero}$ from the analog-to-digital converter 40 at this point ("$D_{zero}$ =A/D OUTPUT") is stored as the new zero-point ("STORE $D_{zero}$ AS NEW ZERO A/D VALUE"). A flag is set to indicate the completion of the zero-point adjustment ("SET COMPLETION FLAG FOR ZERO ADJUSTMENT") and the subroutine ends.

One of the characteristics of the control unit of the present invention is that its weight-monitoring section includes separate digital-to-analog converters DA1 and DA2 for rough and fine zero-point adjustments.

When the initial loads of the weighing devices are nearly equal as is often the case, however, it is usually not necessary to repeat the entire zero-point adjustment process on all weighing devices. Instead, it may be sufficient to carry out both rough and fine adjustments on only one of the weighing devices.

After the bias value $B_1$ for rough adjustment is obtained by the adjustment of this one weighing device, this value may be used for the other devices so that only fine adjustments need to be done on the remaining weighing devices. A flow chart (not shown) for a situation like this where only zero drifts need be corrected and rough adjustments are not necessary may look similar to that of the subroutine ZERO described above, but the comparable loop need be repeated only 8 times because only the bottom part $B_2$ of the binary code is considered and the bias value $B_1$ for rough adjustment need not be outputted.

The aforementioned advantage of setting the voltage ratio from the zero-point adjustment digital-to-analog converters DA1 and DA2 to be $2^7$ rather than $2^8$ becomes apparent at this point. An increase of this ratio from $2^7$ to $2^8$ means that the largest error that can be corrected by the fine adjustment routine like this becomes bigger by a factor of 2.

A further characteristic of the control unit according to the present invention is that the entire zero-point adjustment circuit including both rough and fine adjustments is put behind the multiplexer 24 so that the number of component parts is significantly reduced. Moreover, since both rough and fine adjustments can be carried out automatically and simultaneously by a computer, zero-point adjustment becomes easier and faster. This should in fact be contrasted with conventional zero-point adjustment circuits which, although called "automatic", are only partially automatic. According to typical examples, what is referred to above as rough adjustment is usually carried out by manually operating variable resisters for adjustment. Since a combinational weighing system typically includes 10 through 15 weighing devices to be zero-adjusted, such manual rough adjustment was a cumbersome procedure.

The subroutine SPAN is called by a span command as explained above. A span adjustment means an adjustment made in such a way that, when an analog signal representing a weight value obtained by a weighing device is converted into a digital signal, this digital signal will correspond to a value by which the user wishes to represent the actual weight of the weighed load. Assume, for example, that the user wants a load of 100 g to be represented by a digital value of 1000, but an unadjusted control system converts a weight signal corresponding to 100g into a digital signal of 1010. In such a case, it is necessary to effect an adjustment in such a manner that the digital output value is changed from 1010 to 1000. This step is called a span adjustment.

The conventional method of span adjustment involved a repetition of adjustments until convergence could be obtained. This is explained more in detail in FIG. 5, wherein $W_O$ and $W_T$ respectively denote the weight values when a weighing device under consideration is unloaded and when it is carrying a standard weight, the difference ($W_T$-$W_0$) thus representing the effect of the standard weight. According to the conventional method, an unadjusted span is determined first by obtaining outputs $N_0$ and N (corresponding to $D_{zero}$ and $S_n$, respectively) from an analog-to-digital converter respectively when the weighing device is unloaded and when it is loaded, the difference N-$N_0$ being the unadjusted span. In order to obtain a desired span $N_S$ (corresponding to $S_{ref}$ in FIG. 3), the conventional method was to adjust the analog-to-digital converter so that the output therefrom with the standard weight thereon will change from N to a new value $N'_c$ such that $N'_c - N_0 = N_S$. With the aforementioned adjustment of the analog-to-digital converter, however, its zero-point also shifts, say, to $N'_{c0}$. Thus, the span does not change from the original unadjusted value N-$N_0$ to the desired span value $N_S$ but to a new span value $N'_c$-$N'_{c0}$ which, though closer to $N_S$ than the aforementioned unadjusted span, is not equal to $N_S$. It is necessary therefore to repeat this process until conversion is obtained.

The span adjustment program according to the present invention, by contrast, does not require the standard weight to be placed on and taken off the weighing device many times until conversion is obtained. As explained above, if the analog-to-digital converter is adjusted so that the output changes from N to N' and the no-load output changes from $N_0$ to $N'_0$, the straight line defined by the points ($W_0$, $N'_0$) and ($W_T$, N') in the graph of FIG. 5 will pass the origin because of the proportionality relationship between the weight value and the converter output. Since the new span is N'-$N'_0$ and the purpose of span adjustment is to make it equal to $N_S$ rather than N'-$N_0$=$N_S$, we can derive from the relationships between similar triangles formed in FIG. 5 that $N'=N_S N/(N-N_0)$ and $N'_0 = N_0 N_S/(N-N_0)$. The method of span adjustment according to the present invention can therefore be summarized as follows.

The reference voltage to the analog-to-digital converter 40 is set at its lowest possible value and the output $D_{zero}$ therefrom is read when the weighing device of interest is free of a load. Next, a standard weight is added and the output $S_n$ is read. A desired span value $S_{ref}$ is assumed to be predetermined and stored. These three values uniquely determine $S_{target}=S_n S_{ref}/(S_n-D_{zero})$ and $D'_{zero}=D_{zero}S_{ref}/(S_n-D_{zero})$ as above. With the standard weight still kept on the weighing device, the span adjustment digital-to-analog converter DA3 is adjusted by a well-known sequential comparison-type analog-to-digital conversion method until the output from the analog-to-digital converter 40 reaches the value $S_{target}$. After the span adjustment is completed, the previously stored zero-point value $D_{zero}$ is corrected (updated) to $D'_{zero}$.

Span adjustment is carried out after zero-adjustments of all weighing devices have been completed. This may be accomplished either by placing a standard weight on each weighing device sequentially to span-adjust one device at a time or by placing standard weights on all weighing devices so that they can all e adjusted automatically.

The subroutine SPAN of FIG. 3 is called by a span command as explained above. For the span adjustment of the nth weighing device ("HEAD NUMBER =n"), preset values $ZD_n$ and $SD_n$ are inputted to the digital-to-analog converters as in the subroutine ZERO. Since the span adjustment is carried out after zero-point adjustments of all weighing devices, this means that the digital zero-bias values determined by the zero-point adjustment process are outputted to the digital-to-analog converters for zero adjustment 26 and 27. With the standard weight carried by the weighing device of interest (the nth), signals are sent to the sample-and-hold circuits and to the analog-to-digital converter 40 ("A/D DATA IN") and the target output $S_{target}$ is calculated by the formula described above. In this calculation, the value of $D_{zero}$ obtained in the previous-point adjustment process and stored in MEMORY2 is directly utilized.

After $S_{target}$ is calculated, the following several steps are for determining a digital value $SD_n$ corresponding to the voltage necessary for the desired span, or that digital value which, when inputted to the digital-to-analog converter for span adjustment DA3, will cause the analog-to-digital converter 40 to output the desired digital value $S_{target}$. This is done by a sequential comparison routine described above in connection with the subroutine ZERO. Since the digital-to-analog converter for span adjustment DA3 is a 14-bit converter, it is carried out in this situation by means of a 14-cycle loop (from "j=14"to "j=0?"). As done in the subroutine ZERO, a span error flag is set if the value $SD_n$ thus obtained is zero or exceeds a predetermined maximum value. Otherwise, a completion flag is set, the span command is reset and the subroutine ends after a request signal RQ is outputted to the main computer CPU1 to solicit a next command.

The drive-control computer CPU3 is adapted to keep monitoring the conditions of the hoppers and feeders ("T.H. CONTROL", "W.H. CONTROL", "P.H. CONTROL" and "FD. CONTROL") and, like the weight-monitoring computer CPU2, outputs a request signal RQ to the main computer CPU1 ("RQ TO CPU1") to solicit a command, causing an exchange of signals BUSRQ and BUSAK. Actual motion of the hoppers, however, is controlled by the hopper driving CPUs 51-1. . . 51-n and 52 each of which is assigned an identification switch (which may be a 4-bit switch if the number of article batch handling units in the system is 14 as in the embodiment which has been in consideration) and each hopper operating signal outputted from the drive-control compute CPU3 includes a message for identifying the hopper driving computer to which it is addressed. When one of the hopper driving computers recognizes that the outputted message is addressed to itself, it accepts the message and causes the associated driver 54-1. . . 54-n or 55 to function according to the message. In other words, these hopper driving CPUs 51-1. . . 51-n and 52 keep monitoring the conditions of the hoppers and the message from the drive-control computer CPU3 functions as an interrupt. This mode of operation is quicker than if it were done by a command.

There are timers provided to hoppers and feeders (such as weigh hopper timer) so that the radial feeder and hoppers associated with each article batch handling unit are sequentially driven according to a predetermined timing schedule. Such timing schedule can be adjusted by an input from the input-output unit as will be explained below. According to one embodiment of the invention, furthermore, the hoppers to be driven may be divided into three groups (partitions) so that the hoppers belonging to different groups will have different timing schedules in such a way that they do not discharge simultaneously. This is to reduce the adverse effects of collisions among article batches being discharged into the timing hopper or a collecting chute. This mode of operation is referred to as the stagger dump mode in FIG. 4.

When the main (calculation) computer CPU1 completes a combinational computation and selects a particular combination of article batch handling units, the selection is communicated to the drive-control computer CPU3 so that the hoppers and radial feeders associated with the article batch handling units in the selected combination are activated according to the timing schedule explained above. The drive-control computer CPU3 also participates in adjusting the vibrations (intensity and timing) of the feeders in accordance with inputs from the input-output unit.

The main computer CPU1 is programmed to carry out combinational calculation and to generally control the operation of the system. Data and commands inputted by the user and signals soliciting the user's command are communicated through this computer. Methods of combinational calculation have been known and incorporated in many automatic weighing machines such as aforementioned Models CCW-201RLC and CCW-211RLC of the assignee corporation. Detailed explanation of FIG. 2 is therefore omitted.

As recited above, one of the objects of the present invention related to a combinational weighing system is to provide an input-output unit which is easy to operate. This object is attained in one aspect by providing a remote control computer CPU4 which is programmed, as will be explained in detail below, so that even a relatively inexperienced user can operate the system easily. In another aspect, various input and output means shown in FIG. 1 such as the printer PRINTER, the displayer (such as a plasma display panel) DISPLAY and a control panel including the keyboard (KEYS) are built in a unitized structure (not shown).

FIG. 6 is a front view of the control panel schematically drawn according to one embodiment of the present invention, characterized in that it includes only a relatively small number of keys. The ON and OFF keys are for switching power on and off. The START key is used not only for starting zero-point and span adjustments, the printer PRINTER, etc. but also for specifying certain items to be inputted to the main computer CPU1. The STOP key is used not only for stopping the operation, printing, etc. but also for changing the display mode back to the initial menu (to be explained below). The DISP key is used for changing the display mode to a print display mode. The ON LINE/OFF LINE key is used for placing the entire operation under the control of a host computer and disconnecting such a connection with a host computer. During an ON LINE period, the other keys cannot be operated. The UP and DOWN keys indicated by upward and downward pointing arrows are for moving a cursor up and down on the display panel. The number keys 0–9 are for inputting numerical values. The CLEAR (C) key is for clearing a numerical entry. The SET key is used not only for inputting the value set by the number keys into the computer memory but also for shifting the cursor to the next set item.

The basic function of the remote control computer CPU4 is to allow the user to communicate with the system via the main computer CPU1. In order to make the operation of the system easy and simple, the remote control computer CPU4 is so programmed that the user can input commands and data interactively. In other words, the remote control computer CPU4 is programmed to display various menus and a curser which the user can freely move on the display screen (which may be a plasma display panel as mentioned above or alternatively a cathode ray tube) by handling some of the aforementioned keys (or buttons). According to one embodiment, the display holds up to eight lines of information and the cursor is a blinking square, indicating an item with respect to which an input is invited. For menus which are longer than eight lines, the first eight lines are displayed initially. The remaining lines can be displayed by first pressing the DOWN key to move the cursor to the bottom of the display. Then, the display can be scrolled up one line at a time by further pressing the DOWN key. The display returns to the first line of the menu if it is scrolled up past the last line of the menu. The scrolling feature also works in reverse: if the UP key is pressed when the cursor is on the first line, the display is changed to the last menu line. The display is also adapted for various messages to guide the user. An audio alarm (buzzer) is adapted to sound if an incorrect key is pressed.

A further object of the present invention related to a combinational weighing system is to provide a means whereby the scope of operation thereof can be varied, depending on the qualification of the user. According to one embodiment of the present invention which will be described in detail hereinafter, the program for the remote control computer CPU4 is so structured that the users are classified into three levels according to the scope within which they are allowed to operate the system. Level 1 is for general users, Level 2 includes supervisors and Level 3 is for engineers with special knowledge of the system. The number of items that can be selected from a menu increases as the level of the user becomes higher. The total number of items is 10 and they are displayed together with date and time after the power is switched on and a title display is made for a brief moment such as three seconds. The first three of these items are considered Level 1 items and the next five items are Level 2 items. The final two items are Level 3 items. These 10 items will be briefly explained below.

The first item is titled "Zero-Adjustment". Zero-point adjustment can be effected either on all weighing devices or only on a specified one, depending on how a message (numerical value) is inputted. When only the items of Level 1 are displayed, the display can be changed to that of Level 2 or Level 3 by entering a code word. Such a code word is sometimes referred to as the password or the keyword. These two words are often used interchangeably.

The second item is titled "Production" which is for starting a normal weighing process. The product name and target weight $W_T$ are displayed when the choice is inputted by a code number. The third item is titled "System Draining" which is used to discharge the articles remaining in the apparatus either when the articles being weighed are to be changed or at the end of the day.

The fourth item is titled "Function". This step is used to set the date, time, feed control, weight control and calculation mode by moving the cursor to the corresponding sub-item in the "Function Menu" which is displayed as soon as "Function" is selected. The feed control is to determine whether the vibration intensity and timing of the dispersion and radial feeders should be controlled automatically or manually. Manual control should be selected if automatic control does not work properly, for example, in the case of sticky products. The weight control is to specify how a combination of article batch handling units should be selected. The selection may be in terms only of a minimum weight so that the total weight of the article batches in the selected combination should be equal to or greater than a specified target value. Alternatively, it may be required additionally that the total weight in the combination must not exceed a certain upper limit $W_{up}$. The calculation mode specifies whether combinational calculations may be carried out for a second time if a combination satisfying the conditions for selection was not obtained in the first attempt.

The fifth item is titled "Calculation" and is used as a verification and diagnostic tool by displaying the selected weighing devices and the weight values from each.

The sixth item is titled "Prearrangement" and is used to set any of the items which becomes displayed in a "Prearrangement Menu". Among the many items that can be set in this step are the target weight to be discharged to the packaging unit PU, the maximum upward deviation from the target weight, the vibration intensity and interval between starting times of dispersion and radial feeders, the number of times (dump count) which the articles will be discharged from the system to deliver the target weight, the product name to be entered by a numbered letter code (such as "10" representing "A" and "11" representing "B"), etc.

The seventh item is titled "Span Adjustment" and is for performing span adjustment. A selection is made whether all weighing devices or only a single weighing device should be adjusted. After the START key is pressed, the display returns to the initial menu if no error occurs. There is no need to press the STOP key.

The eighth item is titled "Adjustment" and is for setting any of the sub-items in the "Adjustment Menu"- which is displayed. Among the many such sub-items are the specification of article batch handling units to be deactivated, the setting of various delay times such as the time interval between the opening of a weigh hopper and that of the associated pool hopper.

The ninth and tenth items are for adjustments to be made only by trained engineers.

In summary, the input/output unit of the present invention for a combinational weighing apparatus is compact but versatile. It is compact because the numbers of keys on the control panel is very limited in view of the great variety of adjustments and mode settings that can be achieved therefrom and further because both a display means and a printer means can be built into a unitized structure with the control panel. It is versatile because it is easy to operate and yet can perform a large variety of functions. This is a particularly significant advantage achieved by this invention because, as stated at the outset, the major purpose of using a set of three microcomputers to perform the basic functions of a combinational weighing system was to gain flexibility by carrying out most of the adjustments and mode settings by software. As flexibility is gained and a larger variety of options becomes available, simplicity of operation becomes even more desirable than before.

The system operation is made easy firstly because different types of controls and adjustments which used to be carried out at different parts of the system can now be performed from one centralized location and secondly because a menu formalism has been adopted so that the user, even if relatively inexperienced, can interactively operate the system by reading instructions which appear as messages in the display means and proceed by choosing items from available options by moving a cursor and operating only a few keys. Its versatile aspects include the capacity of allowing access to different sets of options, depending on the status of the user, simply by defining security codes such as a password and a keyword.

This invention has been described above in terms of only a limited number of embodiments, but the description given above is intended to be interpreted as illustrative rather than as limiting. Many changes and modifications can obviously be made within the spirit of this invention. For example, the combinational weighing system of this invention need not include a timing hopper to collect the article batches discharged from weigh hoppers. Models with a simple collecting chute instead of a timing hopper have been commercially available and a control unit disclosed in FIG. 1 can be made adaptable to such models by removing the timing hopper driving CPU 52 and the timing hopper driver 55. Similarly, the control unit of FIG. 1 can be made adaptable to a combinational weighing system having article batch handling units installed in a side-by-side relationship among themselves rather than in a circular configuration and hence having feeders which are different from the dispersion and radial feeders considered in the embodiments illustrated above.

As for the circuits for zero-point adjustment, it is not necessary as shown in FIG. 1 to provide two circuits separately for rough and fine adjustments. Although it is more economical to provide two 8-bit converters as in the illustrated embodiment than to use one 16-bit converter, the rough and fine zero-point adjustment circuits of the present invention may be combined into a single circuit with one digital-to-analog converter and one subtracter. Such an alternative embodiment has the advantage of reducing the number of constituent components in the circuit.

As already mentioned, furthermore, the level shifter 41 in the weight-monitoring section may be replaced by a voltage divider inserted between the digital-to-analog converter for fine zero-point adjustment 27 and the subtracter for fine zero-point adjustment 32.

As for the combinational computations, a great variety of computer programs have been available and incorporated into prior art combinational weighing systems using only one central processing unit. They include programs which calculate all combinations of all article batch handling units in every cycle, those which calculate combinations only from some (not all) of the article batch handling units, for example, by excluding for a specified number of cycles those article batch handling units which have once been selected in a combination, those which select a combination providing the smallest total weight equal to or greater than a given target weight, those which can select any combination providing a total weight within a specified interval, etc. The flow chart of the main computer CPU1 in FIG. 2 is useable for all these programs either directly or with only minor changes which can be effected by any person skilled in the art of programming.

In short, the description given hereinabove is intended to be construed broadly and all changes and modifications which should be apparent to a person skilled in the art such as those variations illustrated above are to be considered within the scope of this invention.

What is claimed is:

1. A zero-point adjustment unit for a weighing device comprising
    a rough adjustment circuit,
    a fine adjustment circuit, and
    a central processing unit adapted to adjust the zero-point of said weighing device by receiving a no-load weight signal outputted from said weighing device and controlling the output signals from said rough and fine adjustment circuits.

2. The zero-point adjustment unit of claim 1 wherein said rough adjustment circuit includes a first digital-to-analog converter for rough zero-point adjustment and a first subtracter for rough zero-point adjustment, and said fine adjustment circuit includes a second digital-to-analog converter for fine zero-point adjustment and a second subtracter for fine zero-point adjustment.

3. The zero-point adjustment unit of claim 2 wherein said rough and fine adjustment circuits include an analog-to-digital converter, said first subtracter serves to receive an output signal from said first digital-to-analog converter and an analog no-load signal from said weighing device and to correspondingly output a first difference signal, and said second subtracter serves to receive an output signal from said second digital-to-analog converter and an output signal from said first subtracter and to correspondingly output a second difference signal to said analog-to-digital converter.

* * * * *